US011989466B2

(12) United States Patent
Yanagi

(10) Patent No.: US 11,989,466 B2
(45) Date of Patent: May 21, 2024

(54) DEVICE AND COMPUTER-READABLE STORAGE MEDIUM FOR PROVIDING APPROPRIATE ERROR NOTIFICATION

(71) Applicant: Brother Kogyo Kabushiki Kaisha, Nagoya (JP)

(72) Inventor: Satoru Yanagi, Obu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/191,148

(22) Filed: Mar. 28, 2023

(65) Prior Publication Data

US 2023/0325130 A1 Oct. 12, 2023

(30) Foreign Application Priority Data

Apr. 8, 2022 (JP) .................................. 2022-064694
Jan. 11, 2023 (JP) .................................. 2023-002308

(51) Int. Cl.
*G06F 3/12* (2006.01)

(52) U.S. Cl.
CPC ............ *G06F 3/121* (2013.01); *G06F 3/1253* (2013.01); *G06F 3/1288* (2013.01)

(58) Field of Classification Search
CPC ...... G06F 13/00; G06F 3/1204; G06F 3/1226; G06F 3/1236; G06F 3/1257; G06F 3/128; G06F 3/1287; G06F 3/121; G06F 3/1253; G06F 3/1288; H04L 67/02; H04N 1/00; H04N 1/00464; H04W 4/02
USPC ....................................................... 358/1.15
See application file for complete search history.

(56) References Cited

U.S. PATENT DOCUMENTS

| 7,647,430 | B2 * | 1/2010 | Ng ...................... H04L 12/2823 710/5 |
| 10,439,896 | B2 * | 10/2019 | Millington ............ G06F 3/0482 |
| 2004/0093598 | A1 * | 5/2004 | Haga ......................... G06F 8/65 717/173 |
| 2012/0240029 | A1 * | 9/2012 | Sugaya .............. H04N 1/00464 715/234 |
| 2013/0027744 | A1 * | 1/2013 | Takahashi ............. G06F 3/1285 358/1.15 |

(Continued)

FOREIGN PATENT DOCUMENTS

WO 2017/150472 A1 9/2017

*Primary Examiner* — Negussie Worku
(74) *Attorney, Agent, or Firm* — Scully, Scott, Murphy & Presser, PC

(57) ABSTRACT

A device includes a communication interface and a controller. The controller is configured to obtain connection information for connecting the device with a target server from an external device via the communication interface, connect the device with the target server using the obtained connection information, and in response to failing in an attempt to obtain the connection information, provide an error notification varying depending on at what timing the attempt to obtain the connection information has been made. The controller provides a first error notification when the attempt to obtain the connection information has been made at a first timing. The controller provides a second error notification different from the first error notification when the attempt to obtain the connection information has been made at a second timing different from the first timing.

18 Claims, 11 Drawing Sheets

(56) References Cited

U.S. PATENT DOCUMENTS

| | | | |
|---|---|---|---|
| 2016/0203393 A1* | 7/2016 | Amano | H04W 36/165 |
| | | | 358/1.15 |
| 2017/0132169 A1* | 5/2017 | Nelogal | G06F 13/4068 |
| 2018/0176412 A1* | 6/2018 | Takasaki | H04N 1/00973 |
| 2019/0068595 A1* | 2/2019 | Mochizuki | G06F 21/608 |
| 2019/0187945 A1* | 6/2019 | Liu | G06F 3/1222 |
| 2019/0303069 A1* | 10/2019 | Ruan | H04M 1/72415 |
| 2020/0099819 A1* | 3/2020 | Shiraki | H04N 1/32797 |
| 2021/0072931 A1 | 3/2021 | Matsushima et al. | |
| 2021/0306522 A1* | 9/2021 | Okuno | H04N 1/00384 |
| 2022/0345917 A1* | 10/2022 | Koide | H04W 24/08 |
| 2022/0379199 A1* | 12/2022 | Lea | A63F 13/31 |

* cited by examiner

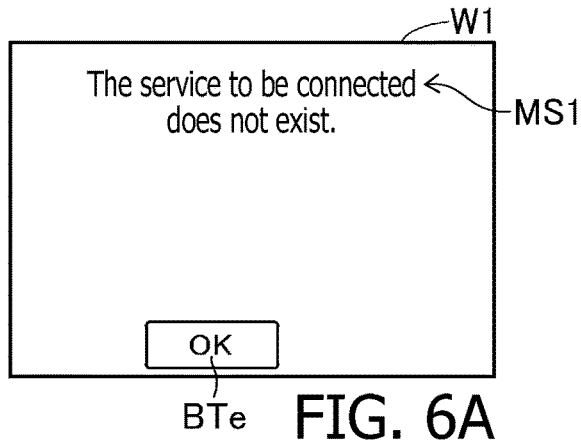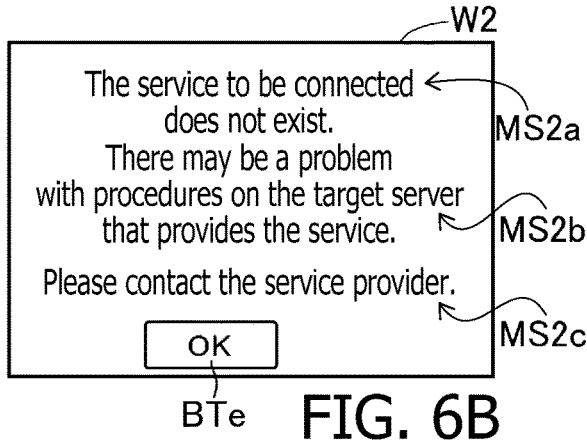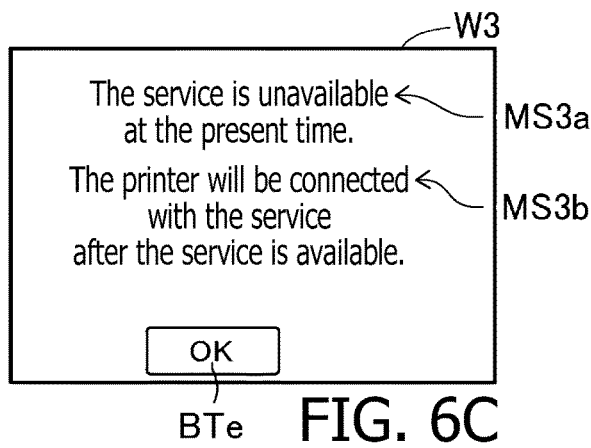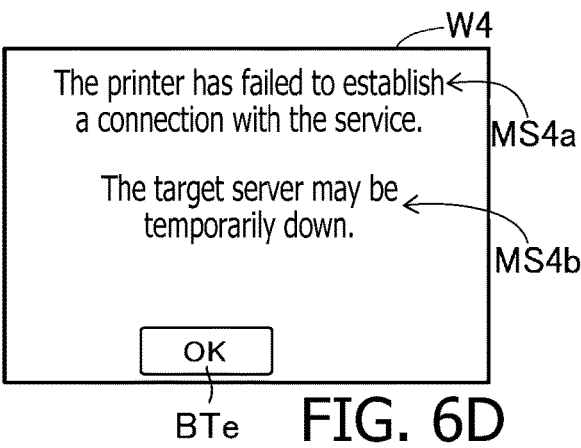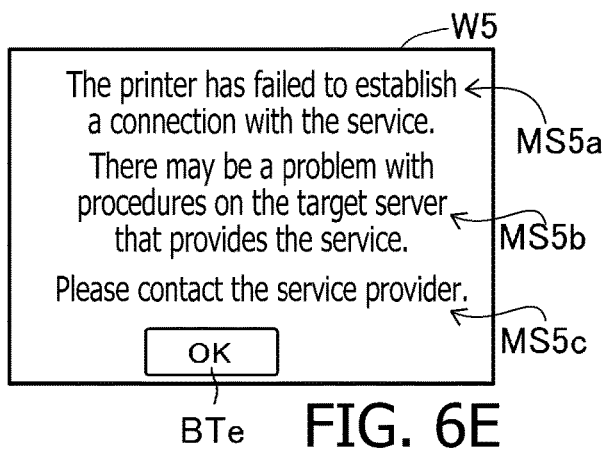

DEVICE AND COMPUTER-READABLE STORAGE MEDIUM FOR PROVIDING APPROPRIATE ERROR NOTIFICATION

REFERENCE TO RELATED APPLICATIONS

This application claims priority from Japanese Patent Applications No. 2022-064694 filed on Apr. 8, 2022 and No. 2023-002308 filed on Jan. 11, 2023. The entire contents of the priority applications are incorporated herein by reference.

BACKGROUND ART

A system has been disclosed in which a multi-function peripheral (hereinafter referred to as an "MFP") accesses a connection destination providing server to receive a URL of a server that stores an application. Using the received URL, the MFP accesses the server to download the application. The MFP displays an error message if the MFP is unable to receive the URL of the server, or if the MFP is unable to obtain display information from the server in an attempt to access the server using the received URL.

DESCRIPTION

However, the above technology uses a common error display regardless of what type of error has occurred. As a result, the MFP, which is unable to provide the user with an appropriate error display, may be insufficient in user-friendliness.

Aspects of the present disclosure are advantageous to provide one or more improved techniques to improve the user-friendliness of a device connectable with a server.

According to aspects of the present disclosure, a device is provided, which includes a communication interface and a controller. The controller is configured to obtain connection information for connecting the device with a target server from an external device via the communication interface. The controller is further configured to connect the device with the target server using the obtained connection information. The controller is further configured to, in response to failing in an attempt to obtain the connection information, provide an error notification varying depending on at what timing the attempt to obtain the connection information has been made. The controller is further configured to, in response to failing in the attempt to obtain the connection information, provide a first error notification when the attempt to obtain the connection information has been made at a first timing. The controller is further configured to, in response to failing in the attempt to obtain the connection information, provide a second error notification different from the first error notification when the attempt to obtain the connection information has been made at a second timing different from the first timing.

According to aspects of the present disclosure, further provided is a device that includes a communication interface and a controller. The controller is configured to obtain connection information for connecting the device with a target server from an external device via the communication interface. The controller is further configured to connect the device with the target server using the obtained connection information. The controller is further configured to, in response to failing in an attempt to obtain the connection information, determine whether to provide an error notification based on at what timing the attempt to obtain the connection information has been made. The controller is further configured to, in response to failing in the attempt to obtain the connection information, provide no error notification when the attempt to obtain the connection information has been made at a first timing. The controller is further configured to, in response to failing in the attempt to obtain the connection information, provide the error notification when the attempt to obtain the connection information has been made at a second timing different from the first timing.

According to aspects of the present disclosure, further provided is a non-transitory computer-readable storage medium storing computer-readable instructions executable by a processor of a device including a communication interface. The instructions are configured to, when executed by the processor, cause the device to obtain connection information for connecting the device with a target server from an external device via the communication interface. The instructions are further configured to, when executed by the processor, cause the device to connect the device with the target server using the obtained connection information. The instructions are further configured to, when executed by the processor, cause the device to, in response to failing in an attempt to obtain the connection information, provide an error notification varying depending on at what timing the attempt to obtain the connection information has been made. The instructions are further configured to, when executed by the processor, cause the device to, in response to failing in the attempt to obtain the connection information, provide a first error notification when the attempt to obtain the connection information has been made at a first timing. The instructions are further configured to, when executed by the processor, cause the device to, in response to failing in the attempt to obtain the connection information, provide a second error notification different from the first error notification when the attempt to obtain the connection information has been made at a second timing different from the first timing.

According to aspects of the present disclosure, further provided is a non-transitory computer-readable storage medium storing computer-readable instructions executable by a processor of a device including a communication interface. The instructions are configured to, when executed by the processor, cause the device to obtain connection information for connecting the device with a target server from an external device via the communication interface. The instructions are further configured to, when executed by the processor, cause the device to connect the device with the target server using the obtained connection information. The instructions are further configured to, when executed by the processor, cause the device to, in response to failing in an attempt to obtain the connection information, determine whether to provide an error notification based on at what timing the attempt to obtain the connection information has been made. The instructions are further configured to, when executed by the processor, cause the device to, in response to failing in the attempt to obtain the connection information, provide no error notification when the attempt to obtain the connection information has been made at a first timing. The instructions are further configured to, when executed by the processor, cause the device to, in response to failing in the attempt to obtain the connection information, provide the error notification when the attempt to obtain the connection information has been made at a second timing different from the first timing.

According to aspects of the present disclosure, further provided is a method implementable on a controller of a device including a communication interface. The method includes obtaining connection information for connecting the device with a target server from an external device via the communication interface. The method further includes connecting the device with the target server using the obtained connection information. The method further includes providing, in response to failing in an attempt to obtain the connection information, an error notification varying depending on at what timing the attempt to obtain the connection information has been made. The method further includes providing, in response to failing in the attempt to obtain the connection information, a first error notification when the attempt to obtain the connection information has been made at a first timing. The method further includes providing, in response to failing in the attempt to obtain the connection information, a second error notification different from the first error notification when the attempt to obtain the connection information has been made at a second timing different from the first timing.

According to aspects of the present disclosure, further provided is a method implementable on a controller of a device including a communication interface. The method includes obtaining connection information for connecting the device with a target server from an external device via the communication interface. The method further includes connecting the device with the target server using the obtained connection information. The method further includes determining, in response to failing in an attempt to obtain the connection information, whether to provide an error notification based on at what timing the attempt to obtain the connection information has been made. The method further includes providing, in response to failing in the attempt to obtain the connection information, no error notification when the attempt to obtain the connection information has been made at a first timing. The method further includes providing, in response to failing in the attempt to obtain the connection information, the error notification when the attempt to obtain the connection information has been made at a second timing different from the first timing.

FIGS. 6A to 6E show examples of notification screens.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

A. FIRST ILLUSTRATIVE EMBODIMENT

A-1. Configuration of System

Figure 1:
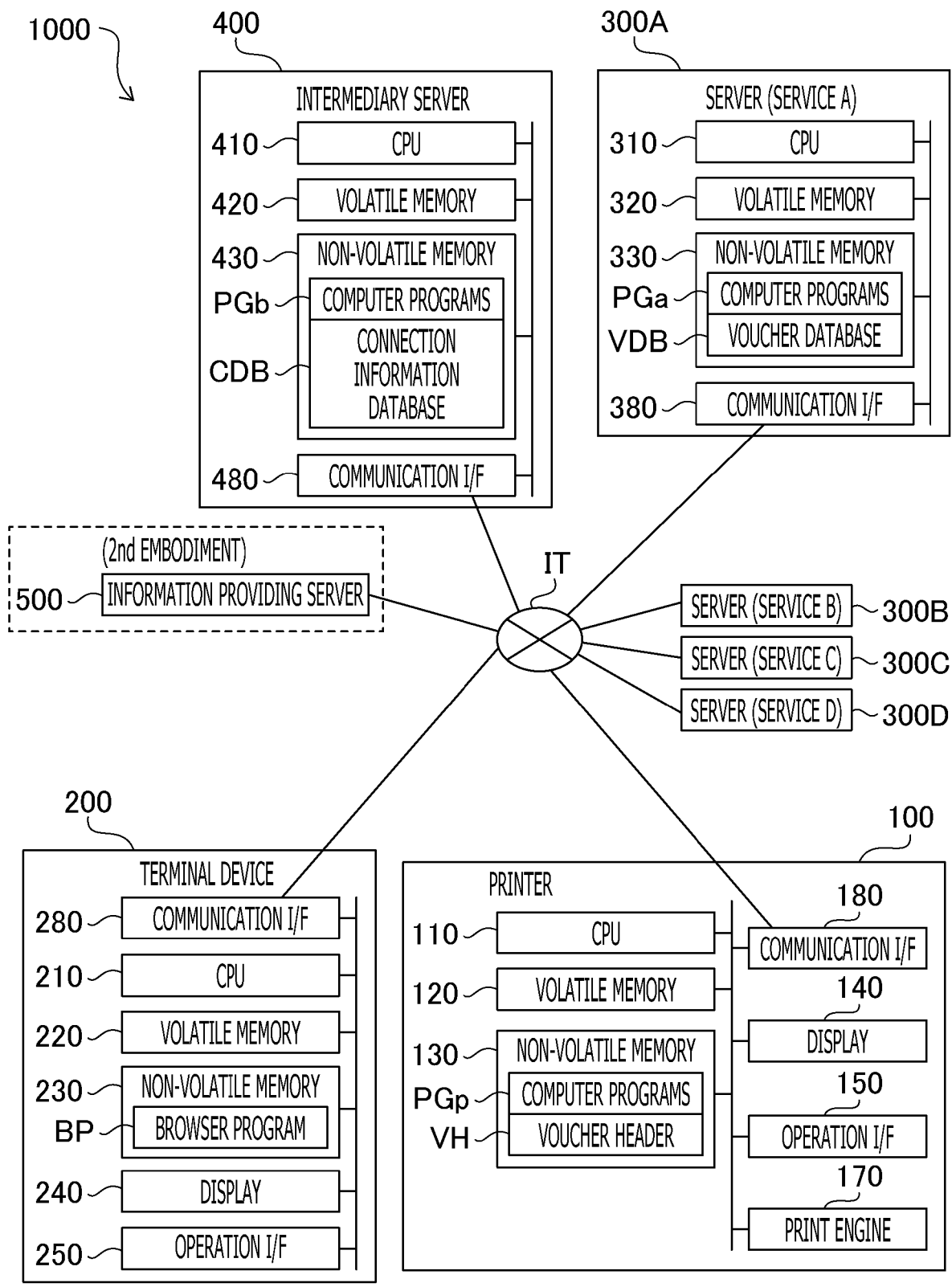
FIG. 1 is a block diagram schematically showing a configuration of a system including a printer, a terminal device, and servers.

FIG. 1 shows a block diagram of a system 1000. The system 1000 includes a printer 100, a terminal device 200 owned by a company selling the printer 100, servers 300A to 300D that provide services using printers, and an intermediary server 400. An information providing server 500 is included in the system 100 in an after-mentioned second illustrative embodiment and is not provided in a first illustrative embodiment according to aspects of the present disclosure. Therefore, the information providing server 500 will be described in the second illustrative embodiment.

The printer 100 includes, as a controller of the printer 100, a CPU 110, a volatile memory 120 such as a DRAM, and a non-volatile memory 130 such as a hard disk drive and a flash memory. The printer 100 further includes a display 140 such as an LCD display to displays images, an operation I/F ("I/F" is an abbreviation for "interface") 150 such as buttons and a touch panel to accept user operations, a print engine 170, and a communication I/F 180.

The communication I/F 180 is an interface for connecting the printer 100 with the Internet IT. Examples of the communication I/F 180 may include, but are not limited to, a wired interface conforming to Ethernet ("Ethernet" is a registered trademark of Fuji Xerox Co., Ltd.) and a wireless interface conforming to the Wi-Fi standards ("Wi-Fi" is a registered trademark of the non-profit Wi-Fi Alliance).

The CPU 110 is a processor to perform data processing. The volatile memory 120 provides a buffer area for temporarily storing various types of intermediate data generated when the CPU 110 performs processing. The non-volatile memory 130 stores computer programs PGp for controlling the printer 100, and an after-mentioned voucher header VH.

In the first illustrative embodiment, the computer programs PGp are provided in a form of being stored in advance in the non-volatile memory device 130 at the time of manufacture of the printer 100. In another instance, the computer programs PGp may be provided in a form of being downloaded from a server connected via the Internet IT or of being recorded on a storage medium such as a CD-ROM.

The CPU 110 is configured to execute the computer programs PGp, thereby controlling the printer 100. For instance, as will be described below, the CPU 110 performs a process (hereinafter, which may be referred to as a "service process") to provide a particular service (e.g., an after-mentioned service such as a setup service, a consumables management service, or a printing service) to a user in cooperation with one of the servers 300A to 300D. Moreover, as will be described below, prior to the service process, the CPU 110 performs after-mentioned preliminary preparations in cooperation with the terminal device 200, a target server (e.g., the server 300A), and the intermediary server 400. In the following, processes and operations by the printer 100 according to aspects of the present disclosure may be performed by the CPU 110 executing the computer programs PGp.

The print engine 170 is configured to perform printing under the control of the CPU 110. The print engine 170 of the first illustrative embodiment is an inkjet print engine to print an image on a recording medium using a plurality of types of ink (e.g., four types of ink with cyan, magenta, yellow, and black) as color materials. In another instance, the print engine 170 may be an electrophotographic print engine to print an image on a recording medium using toner as color materials.

The terminal device 200 is a computer (e.g., a personal computer). In another instance, the terminal device 200 may be a smartphone or a tablet computer. For instance, the terminal device 200 is a computer owned by a sales company that sells the printer 100.

The terminal device 200 includes, as a controller, a CPU 210, a volatile memory 220 such as a DRAM, and a non-volatile memory 230 such as a hard disk drive and a flash memory. The terminal device 200 further includes a display 240 such as an LCD display to display images, an operation I/F 250 such as buttons or a touch panel for accepting user operations, and a communication I/F 280. The communication I/F 280 is an interface for connecting the terminal device 200 with the Internet IT. Examples of the communication I/F 280 may include, but are not limited to, a wired interface conforming to Ethernet ("Ethernet" is a registered trademark of Fuji Xerox Co., Ltd.) and a wireless interface conforming to the Wi-Fi standards ("Wi-Fi" is a registered trademark of the non-profit Wi-Fi Alliance).

The volatile memory 220 provides a buffer area for temporarily storing various types of intermediate data generated when the CPU 210 performs processing. The non-volatile memory 230 stores a browser program BP.

The CPU 210 functions as a web browser by executing the browser program BP. The CPU 210 functioning as the web browser performs a process of registering the after-mentioned voucher VC with the servers 300A to 300D.

Each of the servers 300A to 300D is, for instance, a computer (e.g., a cloud server) operated by a business operator (e.g., a service provider) that provides a service. Examples of the operator(s) that operate the servers 300A to 300D may include, but are not limited to, a business operator that manufactures the printer 100 and a third party that is different from the business operator. The servers 300A to 300D may include two or more servers operated by two or more operators different from each other. Hereinafter, the services provided by the servers 300A to 300D are referred to as services A to D, respectively. The services A to D include, for instance, a setup service, a consumables management service, and a printing service. The setup service is, for instance, a service to install programs such as drivers and applications in the printer 100 and to perform particular settings. The consumables management service is, for instance, a service to manage remaining amounts of consumables (e.g., ink) in the printer 100 and to deliver the consumables to a user according to whether each of the consumables runs out. The printing service is, for instance, a service to generate a print job using an image file sent from the user's terminal and to send the generated print job to the printer 100, thereby causing the printer 100 to perform printing.

The server 300A includes a CPU 310 as a controller, a volatile memory 320 such as a DRAM, a non-volatile memory 330 such as a hard disk drive and a flash memory, and a communication I/F 380. The communication I/F 380 is, for instance, a wired interface conforming to Ethernet ("Ethernet" is a registered trademark of Fuji Xerox Co., Ltd.).

The CPU 310 is a processor to perform data processing. The volatile memory 320 provides a buffer area for temporarily storing various types of intermediate data generated when the CPU 310 performs processing. The non-volatile memory 330 stores computer programs PGa and an after-mentioned voucher database VDB.

For instance, the computer programs PGa are provided in a form of being uploaded to the server 300A by the business operator that operates the server 300A. The CPU 310 of the server 300A is configured to perform, by executing the computer programs PGa, a service process to realize the service to be provided, in cooperation with the printer 100. Moreover, prior to the service process, the CPU 310 performs after-mentioned preliminary preparations in cooperation with the terminal device 200, the server 300A, and the intermediary server 400.

Each of the servers 300B-300D includes the same elements 310 to 380 (not shown) as the aforementioned elements of the server 300A. An explanation of the configuration of each server 300B-300D is omitted.

The intermediary server 400 is, for instance, a computer (e.g., a cloud server) operated by a particular business operator (e.g., a business operator that provides a service or manufactures the printer 100). In substantially the same manner as the server 300A, the intermediary server 400 includes a CPU 410 as a controller, a volatile memory 420, a non-volatile memory 430, and a communication I/F 480. The volatile memory 420 provides a buffer area for temporarily storing various types of intermediate data generated when the CPU 410 performs processing. The non-volatile memory 430 stores computer programs PGb and an after-mentioned connection information database CDB.

The computer programs PGb are provided, for instance, in a form of being uploaded to the intermediary server 400 by the business operator that operates the intermediary server 400. The CPU 410 of the intermediary server 400 is configured to perform, by executing the computer programs PGb, after-mentioned preliminary preparations in cooperation with the printer 100, the terminal device 200, the servers 300A to 300D, and the intermediary server 400.

The printer 100, the terminal device 200, the servers 300A to 300D, and the intermediary server 400 are each connected with the Internet IT. Therefore, these devices 100 to 400 are enabled to communicate with each other via the Internet IT.

Figure 2A:
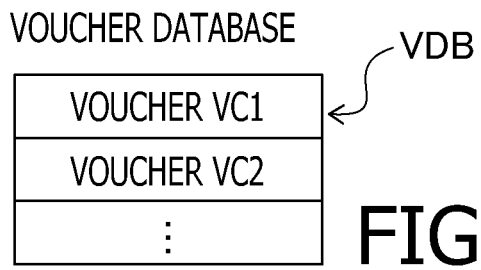
FIG. 2A shows an example of a voucher database.

FIGS. 2A to 2D are illustrations showing databases and information stored in the databases. FIG. 2A shows an example of a voucher database VDB stored in the non-volatile memory 330 of each server 300A to 300D. The voucher database VDB stores one or more vouchers VC (e.g., VC1 and VC2 in FIG. 2A).

Figure 2B:
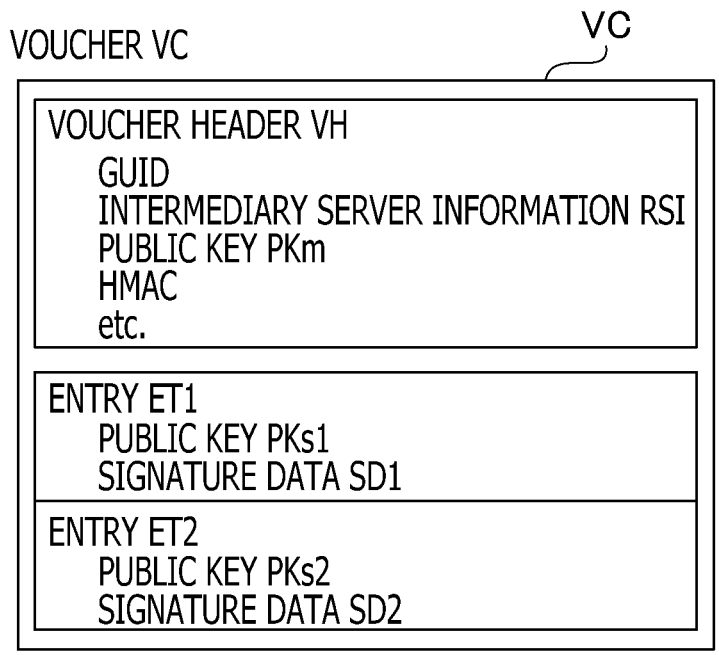
FIG. 2B shows an example of a voucher stored in the voucher database.

FIG. 2B shows an example of a voucher VC. The voucher VC is data that certifies ownership of a device (in the first illustrative embodiment, the printer 100). The voucher VC includes a voucher header VH and one or more entries ET (e.g., ET1 and ET2 in FIG. 2B).

The voucher header VH includes a GUID, intermediary server information RSI, a public key PKm, and an HMAC. The GUID is an identifier for identifying the printer 100. The intermediary server information RSI is information for establishing a communication connection with the intermediary server 400. The intermediary server information RSI includes, for instance, information (e.g., an IP address or a URL ("URL" is an abbreviation for "Uniform Resource Locator")) indicating a location of the intermediary server 400, a port number, and information on a protocol used for the connection. The public key Pkm is a public key corresponding to a private key held by the manufacturer of the printer 100. The HMAC ("HMAC" is an abbreviation for "Hash Message Authentication Code") is a message authentication code that is calculated, e.g., using a secret key (not shown) held by the printer 100, a hash function, and data (e.g., the voucher header VH and a secret held by the printer 100).

As shown in FIG. 1, the voucher header VH is also stored in the non-volatile memory 130 of the printer 100.

Each entry ET (see FIG. 2B) includes a public key Pks and signature data SD. The entry ET is information that is added one by one each time the voucher VC is passed on to a delivery destination as a next owner, i.e., each time the owner of the voucher VC is changed. The public key Pks is a public key corresponding to a private key held by the delivery destination. The signature data SD is data obtained by encrypting the public key Pks using a private key held by a delivery source. The voucher VC in FIG. 2B includes two entries ET1 and ET2. Therefore, it is understood that the voucher VC in FIG. 2B has been passed twice.

Figure 2C:
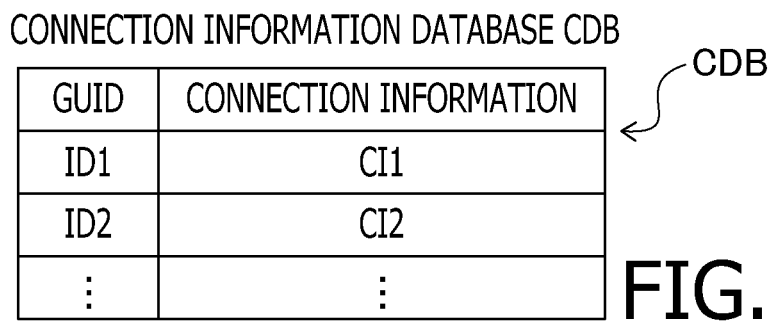
FIG. 2C shows an example of a connection information database.

FIG. 2C shows an example of the connection information database CDB. In the connection information database CDB, one or more pieces of connection information CI are recorded in association with the GUIDs. In the example shown in FIG. 2C, connection information CI1 is recorded in association with a GUID "ID1," and connection information CI2 is recorded in association with a GUID "ID2." Each connection information CI is information to be sent to a device (e.g., the printer 100) identified by the associated GUID.

Figure 2D:
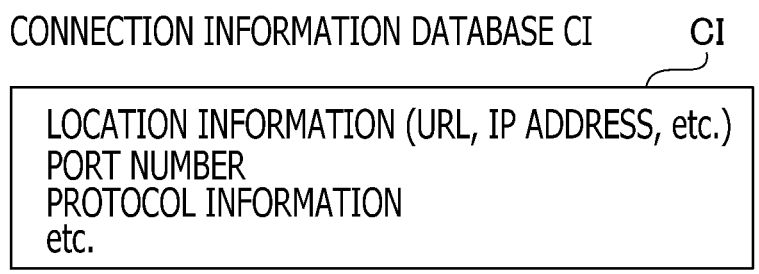
FIG. 2D shows an example of connection information stored in the connection information database.

FIG. 2D shows an example of the connection information CI. The connection information CI is information for establishing a communication connection with a server (e.g., the server 300A) that is to perform the service process in cooperation with a device (e.g., the printer 100). Each connection information CI includes, for example, information (e.g., the IP address or the URL) indicating the location of the intermediary server 400, a port number, and information on a protocol used for the connection.

A-2. Overview of Preliminary Preparations and Service Process of System

Figure 3:
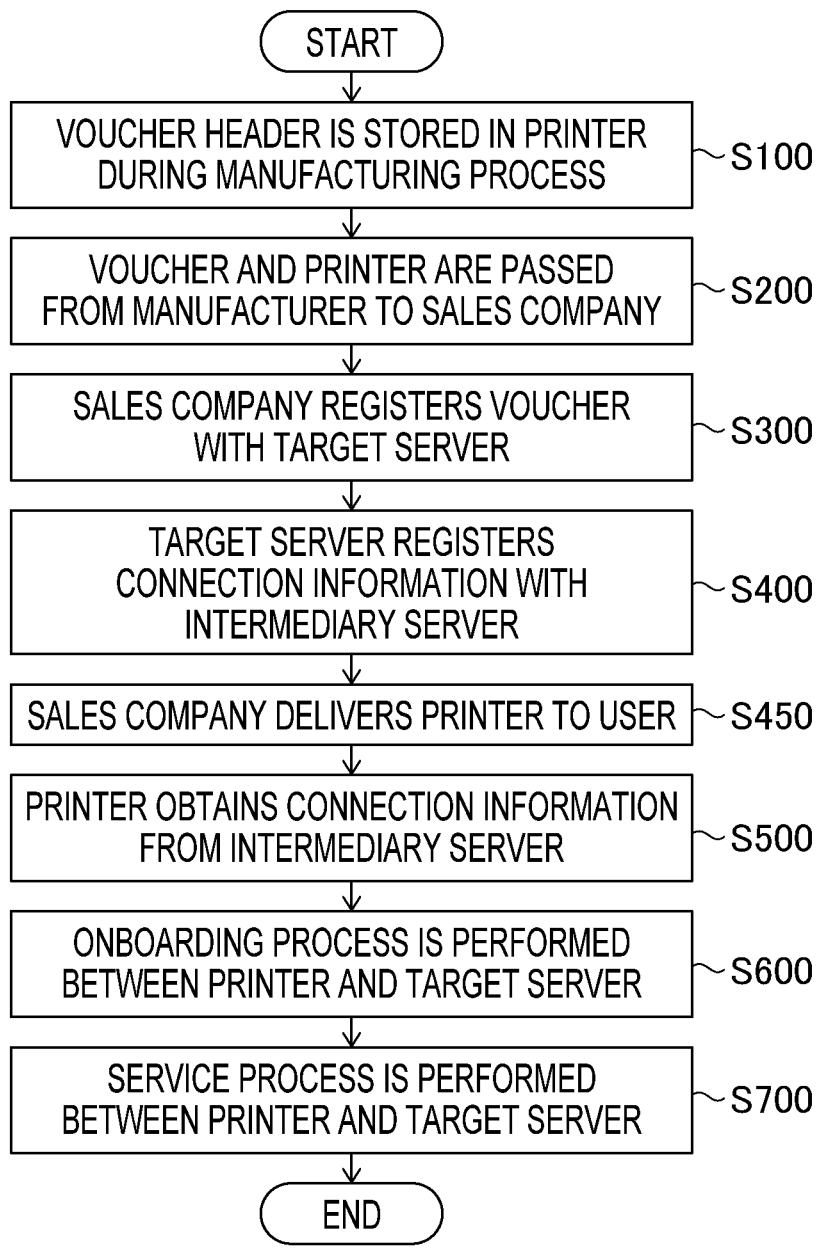
FIG. 3 is a flowchart showing preliminary preparations and a service process of the system.

FIG. 3 is a flowchart showing the preliminary preparations and the service process of the system 1000. The steps S100 to S600 in FIG. 3 are the preliminary preparations to be performed prior to the service process (see S700 in FIG. 3).

In S100, the voucher header VH is stored in the printer 100 during a process of manufacturing the printer 100. The storing of the voucher header VH is performed, for instance, according to a device initialize protocol (hereinafter, which may be referred to as the "DI") specified in FIDO Device Onboard (FDO) Specification (hereinafter, which may be referred to as the "FDO Specification"). Thereby, the voucher header VH, of the voucher VC in FIG. 2B, is generated and stored in the non-volatile memory 130 of the printer 100.

In S200, the voucher VC and the printer 100 are passed from the manufacturer to the sales company. Specifically, the sales company prepares a key pair of the private key and the public key PKs1, and sends, when ordering the printer 100, the public key PKs1 from the terminal device 200 of the sales company to a computer (e.g., a computer system including a web server not shown) of the manufacturer. The computer of the manufacturer generates the entry ET1 (see FIG. 2B) including the public key PKs1 and the signature data SD1 obtained by encrypting the public key PKs1 with the private key of the manufacturer. The private key of the manufacturer is a private key corresponding to the public key PKm (see FIG. 2B) included in the voucher header VH generated in S100. The computer of the manufacturer sends the voucher VC, including the voucher header VH and the one entry ET1, to the terminal device 200 of the sales company. The manufacturer also delivers the printer 100 to the sales company.

In S300, the sales company registers the voucher VC with a target server. For instance, when the user purchases the printer 100 from the sales company, the user places a utilization contract for a service to be used from among the services A to D that are available using the printer 100. Here, a server that provides the service to be used may be referred to as the "target server." In the following, an explanation will be provided under an assumption that the server 300A (see FIG. 1), which provides the service A, is the target server. Specifically, a person in charge at the sales company operates the terminal device 200 to access a web page provided by the server 300A and performs a particular operation. Thereby, a process of registering the voucher VC with the server 300A is performed between the terminal device 200 and the server 300A.

Specifically, the server 300A has a key pair of the private key and the public key PKs2, and sends the public key PKs2 to the terminal device 200. The terminal device 200 generates the entry ET2 (see FIG. 2B) including the public key PKs2 and the signature data SD2. The signature data SD2 is obtained by encrypting the public key PKs2 with the private key (i.e., the private key corresponding to the public key PKs1) of the sales company. The terminal device 200 sends, to the server 300A, the voucher VC (e.g., VC1 in FIG. 2A) that is the voucher VC received in S200 with the entry ET2 added thereto. The server 300A stores the received voucher VC in the voucher database VDB (see FIG. 2A). Thereby, the voucher VC is registered with the server 300A.

In another instance, the voucher VC may be passed from the sales company to the user, and the user may register the voucher VC with the target server (e.g., the server 300A) from the user's terminal device.

In S400, the target server registers the connection information CI with the intermediary server 400. The registration of the connection information CI is performed in accordance with TO0 ("TO0" is an abbreviation for "Transfer Ownership Protocol 0") specified in the FDO specification. For instance, the server 300A that is the target server sends, to the intermediary server 400, the connection information CI (see FIG. 2D) for the printer 100 to access the server 300A, and the GUID of the printer 100. The intermediary server 400 stores the received connection information CI in the connection information database CDB (see FIGS. 1 and 2C) in association with the GUID of the printer 100. Thereby, the connection information CI is registered with the intermediary server 400 in association with the GUID of the printer 100.

In S450, the sales company delivers the printer 100 to the user. The user installs the delivered printer 100 connectable with the Internet IT, and then turns on the printer 100.

When the printer 100 is turned on, the printer 100 obtains the connection information CI from the intermediary server 400 in S500. Specifically, the printer 100 reads out the intermediary server information RSI included in the voucher header VH (see FIG. 1) stored in the non-volatile memory 130. The printer 100 establishes a connection for communication with the intermediary server 400 using the intermediary server information RSI and performs a connection information obtaining process. The connection information obtaining process is performed in accordance with TO1 ("TO1" is an abbreviation for "Transfer Ownership Protocol 1") specified in the FDO specification. Specifically, the printer 100 sends, to the intermediary server 400, the GUID included in the voucher header VH, i.e., the GUID for identifying the printer 100 itself. The intermediary server 400 sends, to the printer 100, the connection information CI associated with the received GUID in the connection information database CDB. Thereby, the printer 100 obtains the connection information CI for accessing the server 300A.

In S600, an onboarding process is performed between the printer 100 and the target server, using the connection information CI. The onboarding process is performed in accordance with TO2 ("TO2" is an abbreviation for "Transfer Ownership Protocol 2") specified in the FDO specification. Specifically, the printer 100 reads out the obtained connection information CI from the non-volatile memory 130, uses the connection information CI to access the server 300A that is the target server, and then performs the onboarding process. The onboarding process includes a connection establishment process, an authentication process, and a service preparation process.

The connection establishment process is a process of establishing a connection between an application running on the printer 100 and an application running on the server 300A that is the target server, for instance, in accordance with TCP ("TCP" is an abbreviation for "Transmission Control Protocol") and IP ("IP" is an abbreviation for "Internet Protocol"). These applications perform the authentication process and the service preparation process after the connection establishment process.

The authentication process is a process in which the printer 100 and the target server mutually check the authenticity of the other party. For instance, the printer 100 sends to the server 300A a token according to a particular format (e.g., EAT ("EAT" is an abbreviation for "Entity Attestation Token") format), and the server 300A checks the validity of the token using a specified public key, thereby checking the authenticity of the printer 100.

The server 300A further sends, to the printer 100, a particular message and signature data obtained by encrypting the message using the private key. The server 300A identifies the voucher VC associated with the GUID sent by the printer 100 from the voucher database VDB, and sends the identified voucher VC to the printer 100. The printer 100 sequentially verifies the entries ET1 and ET2 included in the voucher VC. For instance, the printer 100 verifies the entry ET1 using the public key PKm included in the voucher header VH. The printer 100 verifies the entry ET2 using the public key PKs1 included in the verified entry ET1. Finally, the printer 100 verifies the signature data sent by the server 300A, using the public key PKs2 included in the verified entry ET2, thereby checking the authenticity of the server 300A.

When the server 300A is unable to confirm the authenticity of the printer 100, the server 300A refuses to proceed to the service preparation process. Likewise, when the printer 100 is unable to confirm the authenticity of the server 300A (i.e., the validity of the voucher VC), the printer 100 refuses to proceed to the service preparation process.

The service preparation process is a process of exchanging service information required to perform the service process between the printer 100 and the server 300A after the printer 100 and the server 300A have mutually confirmed the authenticity of the other party in the authentication process. When the service preparation process is completed, the printer 100 and the server 300A are ready to perform the service process. The service information includes, for instance, a token, format information, and protocol information that are used for communication regarding the service process between the printer 100 and the server 300A.

In S700, the printer 100 and the target server (e.g., the server 300A) perform the service process in cooperation with each other. The service process includes, for instance, when the service A provided by the server 300A is the consumables management service, a process in which the printer 100 periodically sends information on the remaining amounts of consumables such as ink to the server 300A.

By using the method described above, there are, for instance, advantages as below. In the above method, the user and the sales company may receive an intended service that the user wishes to use by registering the voucher VC with the target server that provides the intended service (see S300 in FIG. 3). Thereby, the user and the sales company are allowed to easily select the service that the user should receive.

In addition, the printer 100 may obtain the connection information CI of the target server from the intermediary server 400 (S500 in FIG. 3). Thereby, at the stage of manufacture of the printer 100, the intermediary server information RSI for establishing a connection with the intermediary server 400 needs only to be stored in the printer 100 (more specifically, in the non-volatile memory 130), whereas the connection information CI of the target server needs not be stored in the printer 100. Moreover, the printer 100 may obtain, from the target server, the service information required to perform the service process in cooperation with the target server (S600 in FIG. 3). Thereby, the service information needs not be stored in the printer 100 at the stage of manufacture of the printer 100. Thus, the service to be used needs not be assumed at the stage of manufacture of the printer 100. For instance, even if the service to be used is a service that began to be provided after the manufacture of the printer 100 or a service provided by a third party that was not recognized by the manufacturer at the time of manufacture of the printer 100, the user may use the service with the printer 100. As a result, it is possible to achieve flexible provision and use of the service. For instance, the service provider may add new services after beginning to provide the service, without having to modify the printer 100. For instance, the user and the sales company may easily select and change the service to be used. Furthermore, neither the manufacturer, the sales company, nor the user of the printer 100 need to customize the printer 100 in such a manner that the printer 100 is connected with the service that the user wishes to use, at the time of shipment or use of the printer 100. Therefore, it is possible to reduce burdens on the manufacturer, the sales company, and the user of the printer 100.

Furthermore, in the above method, the printer 100 and the target server may mutually check the authenticity of the other party by checking the validity of the voucher VC and the validity of the token. Then, if the printer 100 or the target server is unable to confirm the authenticity of the other party, the printer 100 or the target server may refuse to perform the onboarding process. Thereby, it is possible to prevent security problems such as the printer 100 being connected with an unintended server, and an unauthorized device different from the printer 100 being connected with the target server.

C. DETAILS OF PROCESSES BETWEEN PRINTER AND SERVERS

Next, among the aforementioned preliminary preparations, processes between the printer 100 and the server 300A and between the printer 100 and the intermediary server 400 will be further described.

Figure 4:
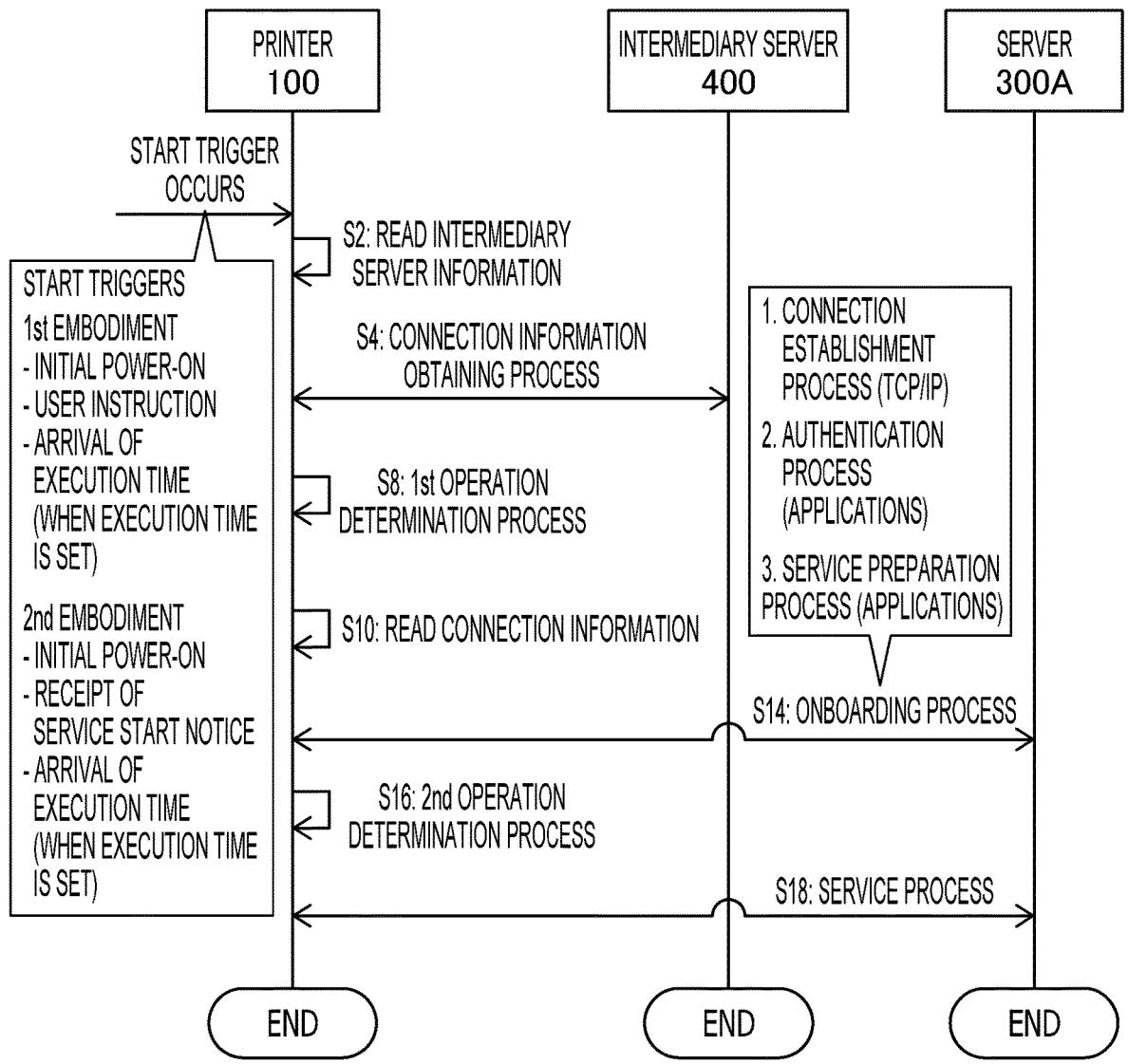
FIG. 4 is a sequence chart showing processes between the printer and a server 300A and between the printer and an intermediary server.

FIG. 4 is a sequence chart showing processes between the printer 100 and the server 300A and between the printer 100 and the intermediary server 400. The above explanation has been made under an assumption that no errors occur in the processes between the printer 100 and the intermediary server 400 (see S500 in FIG. 3) and between the printer 100 and the server 300A (see S600 in FIG. 3). In the following, these processes, including cases where errors occur, will be described.

The sequence of processes in FIG. 4 is started at the timing when a particular start trigger occurs. In the first illustrative embodiment, the start trigger is either the initial power-on, a user instruction, or the arrival of an execution time. As mentioned in the explanation of S500 in FIG. 3, an initially-occurring trigger is the initial power-on, i.e., the printer 100 being turned on for the first time. After an error occurs during the sequence of processes shown in FIG. 4 that has begun to be executed at the time of the initial power-on, and the sequence of processes shown in FIG. 4 is interrupted, the sequence of processes shown in FIG. 4 is restarted in response to either a user instruction or the arrival of the execution time. It is noted that the sequence of processes shown in FIG. 4 is not executed at the time when the printer 100 is turned on for the second or subsequent time.

The aforementioned "user instruction" is, for instance, an instruction that is input into the printer 100 by the user via the operation I/F 150 of the printer 100. In the first illustrative embodiment, for instance, a manual for the printer 100 provides the user with an explanation that instructs the user to input the user instruction into the printer 100 in response to receipt of a notice (hereinafter, which may be referred to as a "service start notice") that the service the user wishes to use has started to be provided. Therefore, it is assumed that the user instruction is input after the user receives the service start notice. The service start notice is provided, for instance, by e-mail, notification to a terminal application installed on a terminal device (e.g., a smartphone) used by the user, mail, or verbal communication (e.g., telephone call) from the sales company.

The aforementioned "arrival of the execution time" is the arrival of the execution time that is set in an after-mentioned first operation determination process or an after-mentioned second operation determination process. When the set execution time has arrived, the printer 100 automatically recognizes the arrival of the execution time using its internal clock (not shown) and starts the sequence of processes shown in FIG. 4.

When the start trigger occurs, S2 and S4 in FIG. 4 are executed. The processes in S2 and S4 of FIG. 4 correspond to S500 in FIG. 3. Specifically, the printer 100 reads out the intermediary server information RSI included in the voucher header VH (see FIG. 1) in S2 of FIG. 4. In S4 of FIG. 4, the printer 100 attempts to perform the connection information obtaining process using the intermediary server information RSI.

If no error occurs in the attempt to perform the connection information obtaining process, the printer 100 obtains the connection information CI and normally terminates the connection information obtaining process. Meanwhile, if an error occurs in the attempt to perform the connection information obtaining process, the printer 100 interrupts the connection information obtaining process without obtaining the connection information CI. Examples of errors that may occur in the attempt to perform the connection information obtaining process may include, but are not limited to, an obtainment error in which the connection information CI associated with the GUID of the printer 100 is not registered with the intermediary server 400. When the obtainment error has occurred, the printer 100 is unable to obtain the connection information CI.

After the connection information obtaining process is terminated normally or interrupted due to an error, the printer 100 performs a first operation determination process in S8 of FIG. 4.

Figure 5:
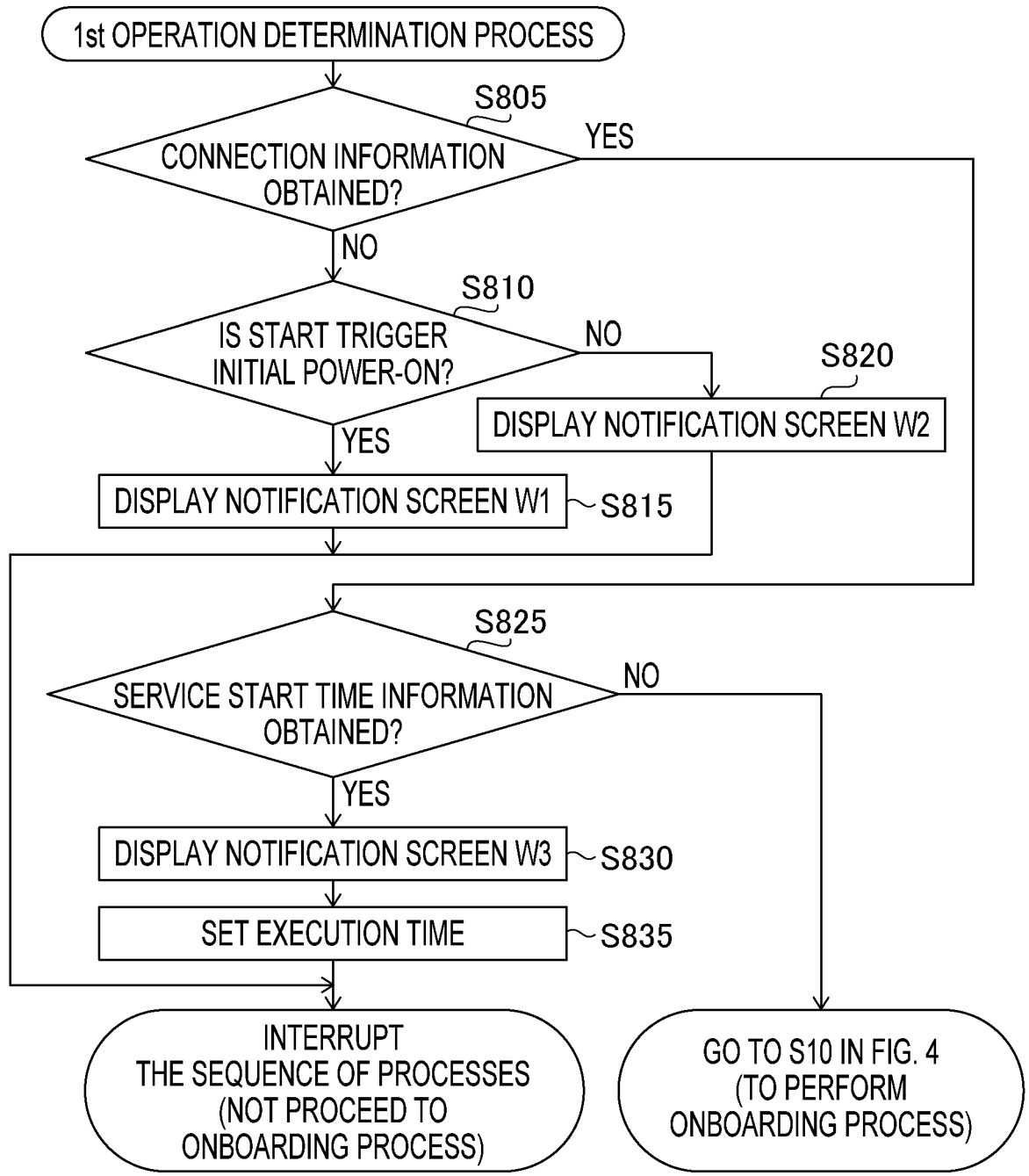
FIG. 5 is a flowchart showing a procedure of a first operation determination process.

FIG. 5 is a flowchart showing a procedure of the first operation determination process in the first illustrative embodiment. In S805 of FIG. 5, the printer 100 determines whether the connection information CI has been obtained in the connection information obtaining process shown in FIG. 4.

When the connection information CI has not been obtained due to an error (S805: No), the printer 100 determines in S810 whether the start trigger for the process in S2 of FIG. 4 is the initial power-on. When the start trigger is the initial power-on (S810: Yes), the printer 100 proceeds to S815. When the start trigger is not the initial power-on (S810: No), that is, when the start trigger is a user instruction or the arrival of the execution time, the printer 100 proceeds to S820.

In S815, the printer 100 displays a notification screen W1 on the display 140 of the printer 100. FIGS. 6A to 6E show examples of notification screens. The notification screen W1 shown in FIG. 6A includes a message MS1 notifying the user that the service to be connected does not exist (i.e., the server 300A that is the target server does not exist), and a display end button BTe. When the display end button BTe is pressed, the display of the notification screen W1 is terminated.

In S820, the printer 100 displays a notification screen W2 on the display 140 of the printer 100. The notification screen W2 shown in FIG. 6B includes a message MS2a notifying the user that the service to be connected does not exist (i.e., the server 300A that is the target server does not exist), a message MS2b notifying the user that there may be a problem with procedures on the server 300A, a message MS2c prompting the user to contact the business operator that operates the server 300A and provide an error notification, and a display end button BTe. When the display end button BTe is pressed, the display of the notification screen W2 is terminated.

When the connection information CI has been obtained (S805: Yes), the printer 100 determines in S825 whether service start time information has been obtained along with the obtained connection information CI. The service start time information may be sent from the intermediary server 400 together with the connection information CI, when the service has not begun to be provided by the server 300A at the present time, but a service start time in the future has been determined. The service start time information is information indicating a future date and time when the service will begin to be provided by the server 300A. In other words, it may be said that the service start time information indicates that the service has not begun to be provided at the present time.

When the service start time information has not been obtained (S825: No), it is likely that the server 300A is providing the service at this point of time. In this case, in order to proceed to the onboarding process, the printer 100 terminates the first determination process and goes to S10 in FIG. 4. When the service start time information has been obtained (S825: Yes), the server 300A is not providing the service at this point of time. In this case, the printer 100 proceeds to S830.

In S830, the printer 100 displays a notification screen W3 on the display 140 of the printer 100. The notification screen W3 shown in FIG. 6C includes a message MS3a notifying the user that the service is not provided by the server 300A at the present time, a message MS3b notifying the user that the printer 100 will be connected with the server 300A after the server 300A starts providing the service, and a display end button BTe. When the display end button BTe is pressed, the display of the notification screen W3 is terminated.

In S835, the printer 100 sets the next execution time for the sequence of processes shown in FIG. 4. For instance, the next execution time is set to a time later than the time at which the service is to begin to be provided, based on the service start time information described above. As described above, the arrival of the execution time set in S835 is one of the start triggers for the sequence of processes shown in FIG. 4. Therefore, in the case where the execution time is set in S835, when the execution time has arrived thereafter, the sequence of processes shown in FIG. 4 is re-executed from S2.

After S815, S820, or S835, the first operation determination process is terminated, and the sequence of processes shown in FIG. 4 is interrupted. Therefore, the onboarding process is not performed in this case. When the next start trigger (e.g., a user instruction or the arrival of the execution time) occurs, the sequence of processes shown in FIG. 4 is re-executed from S2.

When the connection information CI has been obtained (S805: Yes in FIG. 5), and the service start time information has not been obtained (S825: No in FIG. 5), the printer 100 executes S10 and S14 in FIG. 4. The processes in S10 and S14 of FIG. 4 correspond to S600 in FIG. 3. Namely, the printer 100 reads out the connection information CI from the non-volatile memory 130 (S10), and attempts to perform the aforementioned onboarding process using the connection information CI (S14).

If no error occurs in the attempt to perform the onboarding process (including the connection establishment process, the authentication process, and the service preparation process), the printer 100 terminates the onboarding process normally. Meanwhile, if an error occurs in the attempt to perform the onboarding process, the printer 100 is unable to complete the onboarding process, and interrupts the onboarding process. Examples of errors that may occur in the attempt to perform the onboarding process may include, but are not limited to, an error occurring in the connection establishment process, an error occurring in the authentication process, and an error occurring in the service preparation process.

Examples of errors that may occur in the connection establishment process may include, but are not limited to, an arrival error and a response error. The arrival error is an error in which a connection request is made based on location information (e.g., an IP address or a URL) included in the connection information CI, but does not arrive at the server 300A. The response error is, for example, an error in which the connection request has arrived at the server 300A, but the server 300A sends an error in response (e.g., an error indicating that there exists no resource corresponding to the URL).

Examples of errors (hereinafter, which may be referred to as "authentication errors") that may occur in the authentication process may include, but are not limited to, an error in which the printer 100 is unable to confirm the authenticity of the server 300A, and an error in which the server 300A is unable to confirm the authenticity of the printer 100.

Examples of errors that may occur in the service preparation process include, but are not limited to, a provision error in which the service information is unable to be obtained because the server 300A has not started to provide the service. When the provision error has occurred, there may be a case in which the printer 100 is allowed to obtain the aforementioned service start time information from the server 300A. The service start time information is information that indicates a future date and time when the server 300A will start providing the service.

After the onboarding process is normally terminated or interrupted due to an error, the printer 100 performs a second operation determination process in S16 of FIG. 4.

Figure 7:
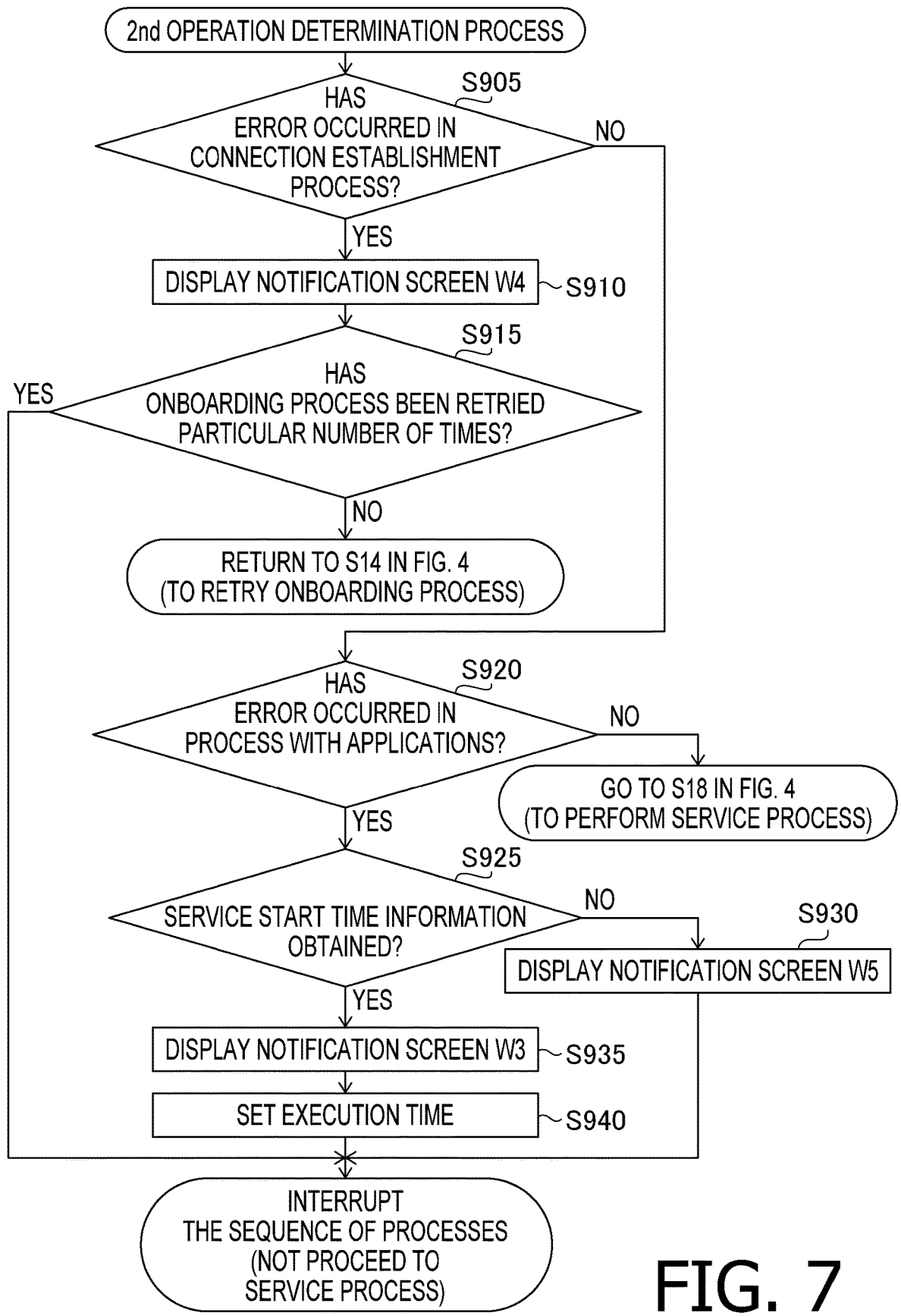
FIG. 7 is a flowchart showing a procedure of a second operation determination process.

FIG. 7 is a flowchart showing a procedure of the second operation determination process. In S905 of FIG. 7, the printer 100 determines whether an error has occurred in the connection establishment process of the onboarding process in S14 of FIG. 4. When an error has occurred in the connection establishment process (S905: Yes), the printer 100 displays a notification screen W4 on the display 140 of the printer 100 in S910.

The notification screen W4 in FIG. 6D includes a message MS4a notifying the user that the printer 100 has failed to establish a connection for communication with the server 300A that is the target server, a message MS4b notifying the user that the target server may be temporarily down, and a display end button BTe. When the display end button BTe is pressed, the display of the notification screen W4 is terminated.

In S915, the printer 100 determines whether the onboarding process in S14 of FIG. 4 has been retried a particular number of times (e.g., 3 to 5 times). When the onboarding process has not been retried the particular number of times (S915: No), the printer 100 goes back to S14 in FIG. 4 and retries to perform the onboarding process. The onboarding process is retried, for instance, after an interval of a particular time (e.g., several minutes). When the onboarding process has been retried the particular number of times (S915: Yes), the printer 100 terminates the second operation determination process, and the sequence of processes shown in FIG. 4 is interrupted. Accordingly, in this case, since the onboarding process is not completed, the service process in S18 of FIG. 4 is unable to be performed.

When no error has occurred in the connection establishment process (S905: No), the printer 100 determines in S920 whether an error has occurred in a process (i.e., the authentication process or the service preparation process) with the applications for the onboarding process in S14 of FIG. 4. When an error has occurred in a process with the applications (S920: Yes), the printer 100 determines in S925 whether the service start time information has been obtained. In other words, it is determined whether the service start time information has been obtained after occurrence of a provision error in the service preparation process.

When the service start time information has not been obtained (S925: No), e.g., when an error has occurred in the authentication process, or when the service start time information is unable to be obtained even if an error has occurred in the service preparation process, the printer 100 displays a notification screen W 5 on the display unit 140 of the printer 100 in S930. The notification screen W5 in FIG. 6E includes a message MS5a notifying the user that the printer 100 has failed to establish a connection for communication with the server 300A, a message MS5b notifying the user that there may be a problem with procedures on the server 300A, a message MS5c prompting the user to contact the business operator that operates the target server and provide an error notification, and a display end button BTe.

When the service start time information has been obtained (S925: Yes), the printer 100 displays the aforementioned notification screen W3 (see FIG. 6C) on the display 140 of the printer 100 in S935. Namely, in this case, the same notification screen is displayed as when the service start time information is obtained in the connection information obtaining process in S4 of FIG. 4. When the display end button BTe is pressed, the display of the notification screen W3 is terminated.

In S940, the printer 100 sets the next execution time for the sequence of processes shown in FIG. 4, in substantially the same manner as in S835 of FIG. 5. For instance, the next execution time is set to a time later than the time at which the service is to begin to be provided, based on the service start time information described above. In the case where the execution time is set in S930, when the execution time has arrived thereafter, the sequence of processes shown in FIG. 4 is re-executed from S2.

After S930 or S940, the second operation determination process is terminated, and the sequence of processes shown in FIG. 4 is interrupted. Therefore, in this case, since the onboarding process is not completed, the service process in S18 of FIG. 4 is unable to be performed.

When no error has occurred in a process with the applications (S920: No), i.e., when the onboarding process has been normally terminated, the printer 100 and the server 300A are enabled to perform the service process in cooperation with each other. In this case, the printer 100 terminates the second operation determination process and proceeds to S18 in FIG. 4.

The process in S18 of FIG. 4 corresponds to S700 in FIG. 3. Namely, in S18 of FIG. 4, the printer 100 and the target server (i.e., the server 300A) perform the service processing in cooperation with each other.

A-3. Operation Examples

According to the sequence of processes described above, when an error has occurred, for instance, the printer 100 retries the onboarding process while displaying one of the notification screens W1 through W5 as appropriate depending on the error. Operation examples are described below.

Figure 8:
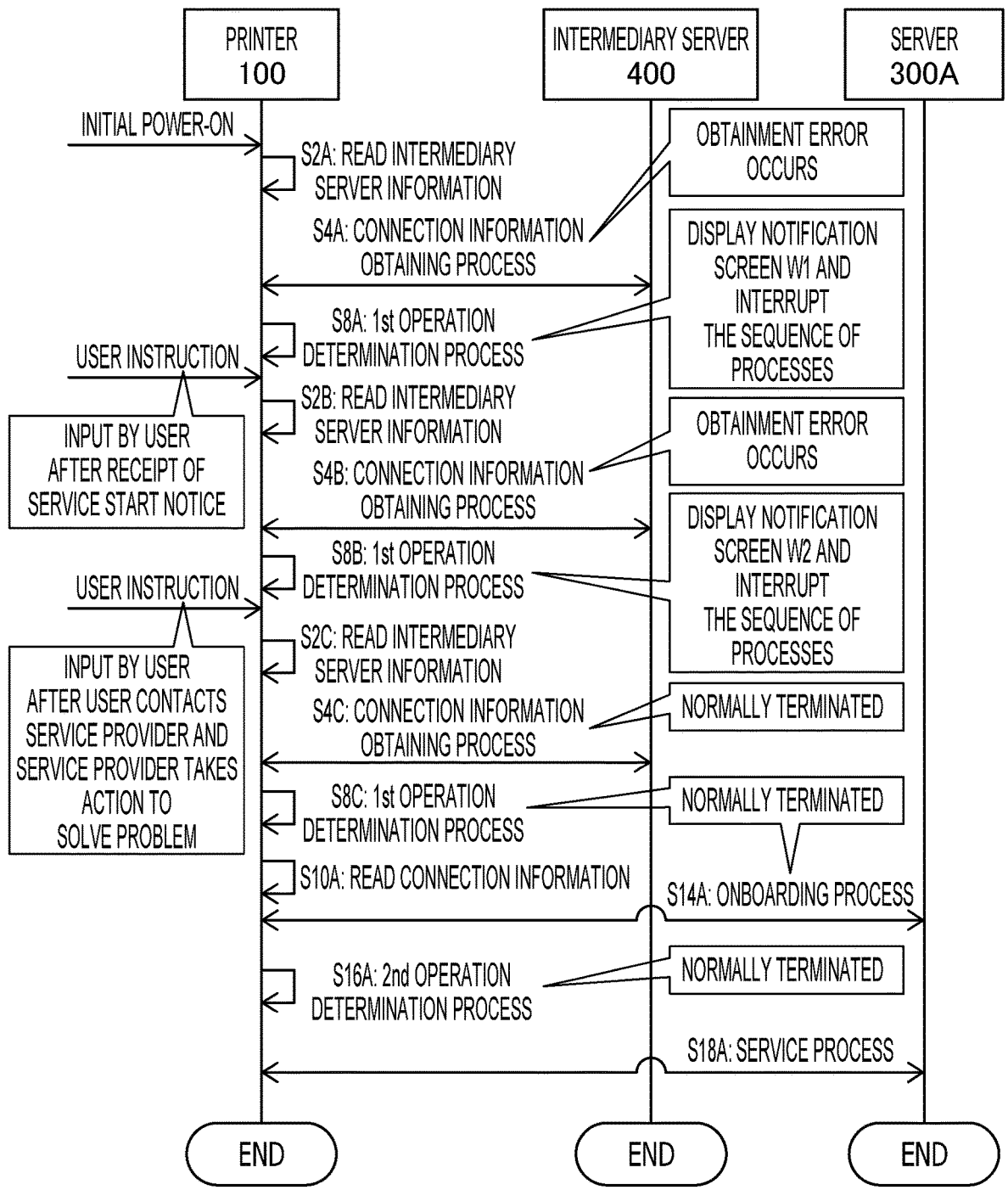
FIG. 8 is a sequence chart showing an operation example 1 of processes between the printer and the server 300A and between the printer and the intermediary server.
Figure 9:
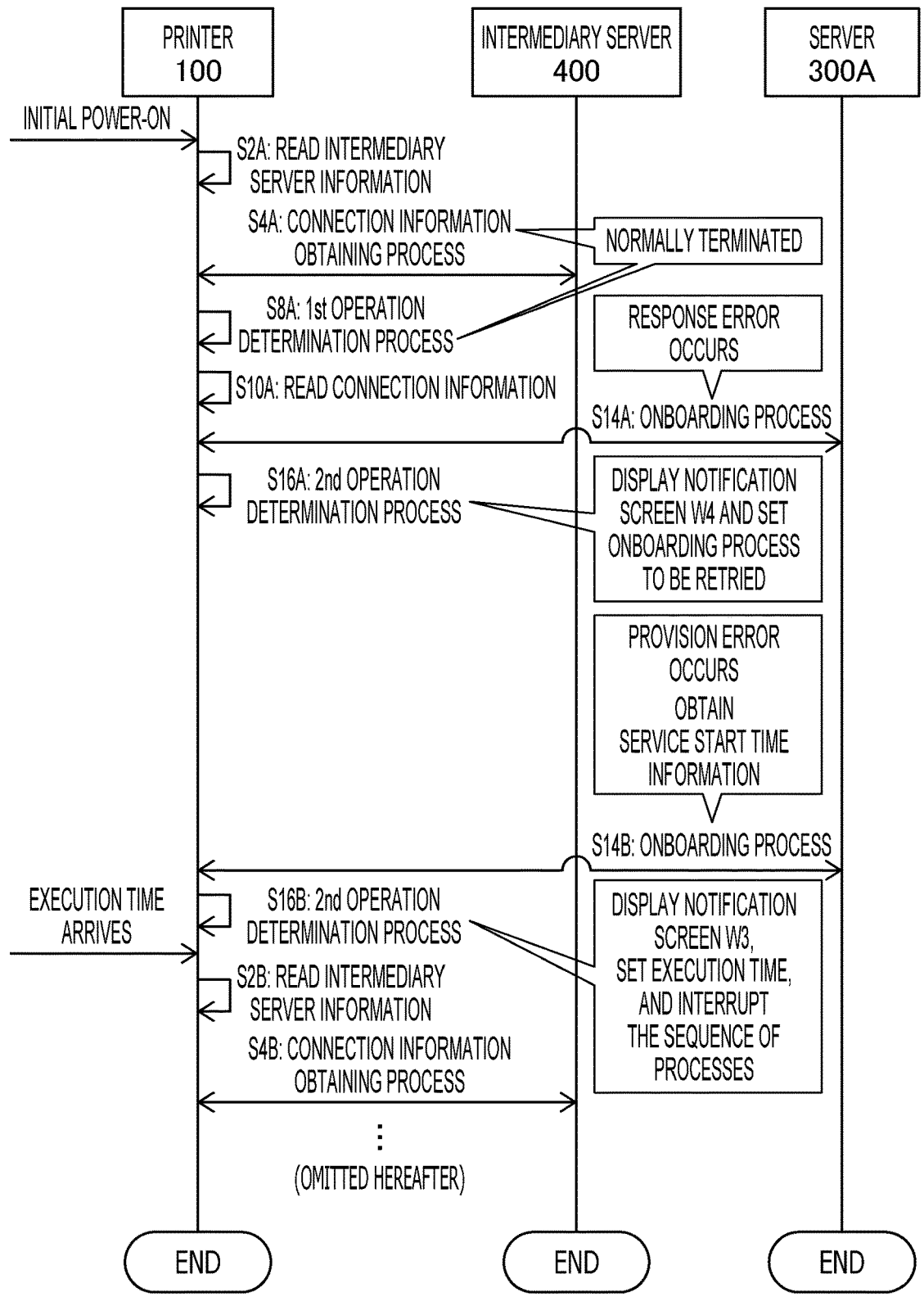
FIG. 9 is a sequence chart showing an operation example 2 of processes between the printer and the server 300A and between the printer and the intermediary server.
Figure 10:
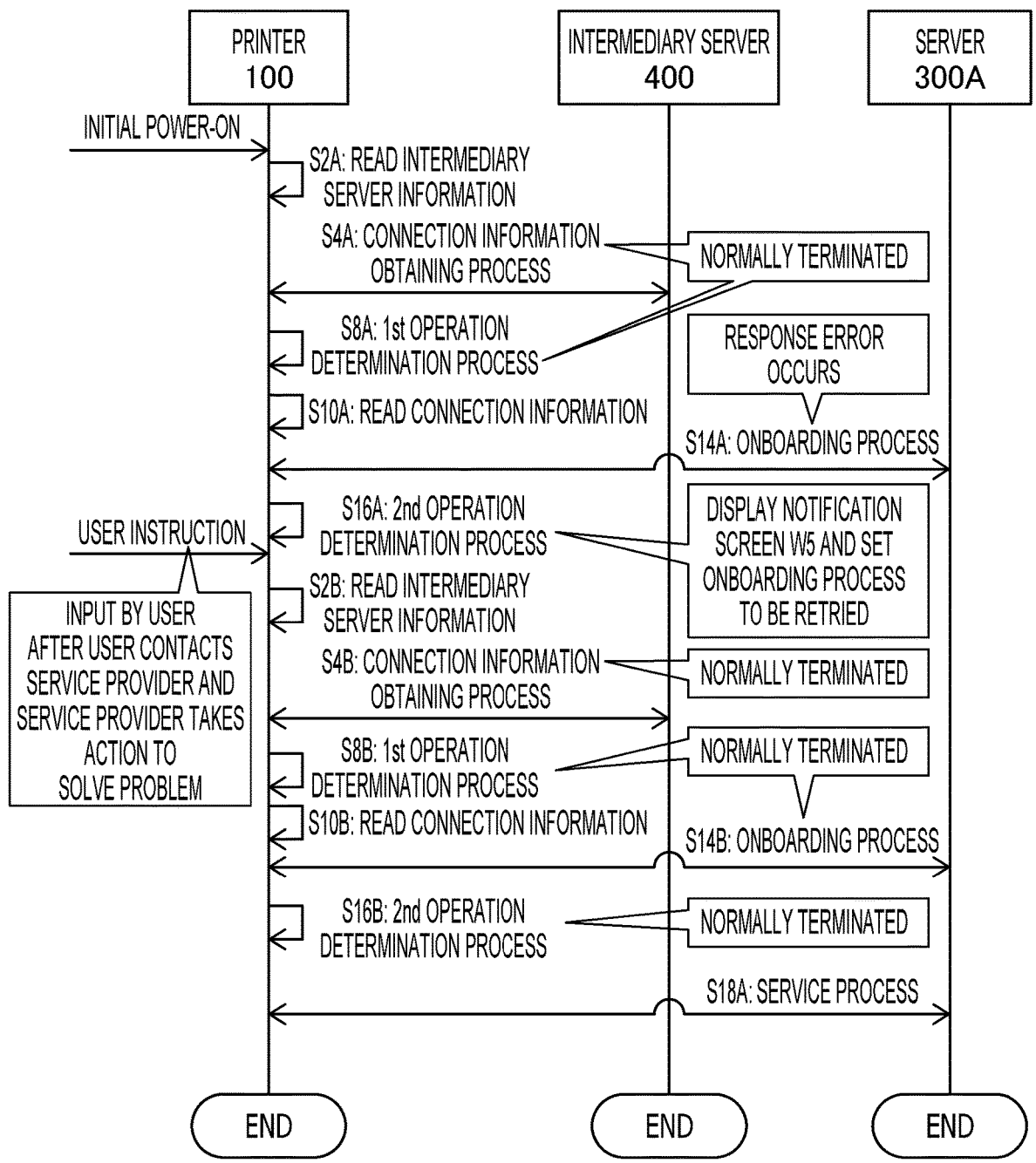
FIG. 10 is a sequence chart showing an operation example 3 of processes between the printer and the server 300A and between the printer and the intermediary server.

FIGS. 8 to 10 show sequence charts of operation examples. In FIGS. 8 and 9, each step to be executed for the first time among the steps shown in FIG. 4 is represented with "A" appended to the end of the reference characters for the same step in FIG. 4. In addition, each step to be executed for the second time among the steps shown in FIG. 4 is represented with "B" appended to the end of the reference characters for the same step in FIG. 4. Moreover, each step to be executed for the third time among the steps shown in FIG. 4 is represented with "C" appended to the end of the reference characters for the same step in FIG. 4.

A-3-1. Operation Example 1

In an operation example 1 shown in FIG. 8, S2A and S4A are executed with the initial power-on as the start trigger.

Here, suppose for instance that an obtainment error in which the connection information CI is unable to be obtained occurs in the connection information obtaining process in S4A of FIG. 8. In this case, in the first operation determination process in S8A of FIG. 8, the notification screen W1 (see FIG. 6A) is displayed, and the sequence of processes is interrupted (S810: Yes, and S815 in FIG. 5).

As described above, the method in the first illustrative embodiment makes it easy to start a new service even after the printer 100 has been manufactured. In the case where the initial power-on is used as the start trigger, the processes in S2A and S4A are executed even before the service is started. Therefore, if an obtainment error occurs when the initial power-on is used as the starting trigger, it is highly likely that the server 300A does not start providing the service at that point of time. In this case, at this point of time, the action to be taken by the user is to wait for the service to start, and the user does not need to take any proactive action such as contacting the service provider. For this reason, the notification screen W1 in FIG. 6A, unlike the notification screen W2 in FIG. 6B, does not include a message indicating the action to be taken by the user. In another instance, the notification screen W1 may include a message indicating the action to be taken by the user, e.g., "Please wait until you receive the service start notice."

When the server 300A starts providing the service, the user receives the service start notice. After receiving the service start notice, the user inputs into the printer 100 the aforementioned user instruction to cause the printer 100 to start the sequence of processes shown in FIG. 4.

When the user instruction is input, the processes in S2B and S4B of FIG. 8 are executed with the input of the user instruction as the start trigger. Here, suppose for instance that, in the connection information obtaining process in S4B of FIG. 8, an obtainment error occurs in which the connection information CI is unable to be obtained, in substantially the same manner as in the above case in S4A. In this case, in the first operation determination process in S8B in FIG. 8, the notification screen W2 (see FIG. 6B) is displayed, and the sequence of processes is interrupted (S810: No, and S820 in FIG. 5).

When the user instruction is used as the start trigger, the user is considered to have received the service start notice. Therefore, it is highly likely that the server 300A has started providing the service. Hence, if an obtainment error occurs when the user instruction is used as the start trigger, some sort of procedural problem (e.g., a procedural error) may have occurred in a process of S100 to S450 in FIG. 3. For instance, due to mistakes in S300 and S400 of FIG. 3, the connection information CI corresponding to the GUID of the user's printer 100 may not have been registered with the intermediary server 400. In this case, it is preferable for the user to contact an appropriate contact destination (in the first illustrative embodiment, the business operator (e.g., the service provider) that operates the server 300A) to provide a notification about the obtainment error. Thereby, for instance, the problem may be solved if the service provider takes an appropriate action after verifying and confirming that a procedural problem has occurred. Hence, the notification screen W2 in FIG. 6B includes the message MS2b notifying the user that there may be a problem with procedures on the server 300A, and the message MS2c prompting the user to contact the service provider operating the server 300A and provide an error notification.

After the user contacts the service provider, and the service provider takes an action to solve the problem, the user again inputs a user instruction into the printer 100.

When the user instruction is input, S2C and S4C in FIG. 8 are executed with the input of the user instruction as the start trigger. Here, in the connection information obtaining process in S4C of FIG. 8, since the aforementioned problem has been solved, the connection information CI is obtained, and the connection information obtaining process is terminated normally. In this case, the printer 100 normally terminates the first operation determination process in S8C of FIG. 8 without displaying any notification screen (S805: Yes, and S825: No in FIG. 5).

Subsequently, S10A through S16A in FIG. 8 are executed. In the operation example 1 shown in FIG. 8, it is assumed that the onboarding process in S14A is terminated normally without any error occurring. In this case, the printer 100 normally terminates the second operation determination process in S16A without displaying any notification screen (S905: No, and S920: No in FIG. 7). Then, in S18A of FIG. 8, the service process is performed between the printer 100 and the server 300A.

A-3-2. Operation Example 2

In an operation example 2 shown in FIG. 9, S2A and S4A are executed with the initial power-on as the start trigger. Here, suppose for instance that the connection information CI is obtained in the connection information obtaining process in S4A of FIG. 9, and the connection information obtaining process in S4A is normally terminated. In this case, the printer 100 normally terminates the first operation determination process in S8A of FIG. 9 without displaying any notification screen (S805: Yes, and S825: No in FIG. 5).

Subsequently, S10A to S16A in FIG. 9 are executed. In the operation example 2 shown in FIG. 9, it is assumed that a response error has occurred in the connection establishment process of the onboarding process in S14A. In this case, in the second operation determination process in S16A of FIG. 9, the notification screen W4 (see FIG. 6D) is displayed, and the onboarding process is set to be retried (S905: Yes, S910, and S915: No in FIG. 7).

If an arrival error or a response error occurs even though the connection information CI has been obtained, it is hard to consider that the server 300A does not exist, and the server 300A may be temporarily down. Hence, the notification screen W4 in FIG. 6D includes the message MS4a notifying the user that the printer 100 has failed to establish a connection for communication with the server 300A, and the message MS4b notifying the user that the server 300A may be temporarily down.

When the server 300A is temporarily down, the connection establishment process of the on-boarding process may be successfully performed if retried several times. Therefore, in this case, the onboarding process is retried in S14B of FIG. 9.

In the onboarding process in S14B, the connection establishment process and the authentication process are assumed to be completed without any errors occurring. In the onboarding process in S14B, a provision error, in which the service information is unable to be obtained because the server 300A has not started to provide the service, occurs in the service preparation process, and the printer 100 obtains the service start time information. In this case, in the second operation determination process in S16B of FIG. 9, the notification screen W3 (see FIG. 6C) is displayed, the next execution time is set, and the sequence of processes is interrupted (S920: Yes, S925: Yes, S935, and S940 in FIG. 7).

Thereafter, when the execution time has arrived after the server 300A started to provide the service, S2B and S4B in FIG. 9 are executed with the arrival of the execution time as the start trigger. The processes in S2B, S4B, and subsequent steps in FIG. 9 are, for instance, substantially the same as S2C to S8C and S10A to S18A in FIG. 8.

A-3-3. Operation Example 3

In an operation example 3 shown in FIG. 10, S2A to S8A in FIG. 10 are executed with the initial power-on as the start trigger. Since S2A to S8A in FIG. 10 are substantially the same as S2A to S8A in FIG. 9, detailed explanations thereof are omitted.

Thereafter, S10A to S16A in FIG. 10 are executed. In the operation example 3 shown in FIG. 10, it is assumed that an authentication error has occurred in the authentication process of the onboarding process in S14A. In this case, in the second operation determination process in S16A of FIG. 10, the notification screen W5 (see FIG. 6E) is displayed, and the sequence of processes is interrupted (S920: Yes, S925: No, and S930 in FIG. 7).

Errors (e.g., an authentication error) in a process with the applications, except for an error in which the service preparation process is unable to be completed since the service does not begin to be provided, may be caused due to some sort of procedural problem (e.g., a procedural error) occurring in a process of S100 to S450 in FIG. 3. For instance, an authentication error will occur, if the voucher VC is not properly delivered due to a mistake in S200 or S300 in FIG. 3, and the printer 100 is unable to confirm the authenticity of the server 300A in the authentication process. In this case, it is preferable for the user to contact an appropriate contact destination to provide a notification about the authentication error. Thereby, for instance, the problem may be solved if the service provider takes an appropriate action after verifying and confirming that a procedural problem has occurred. Hence, the notification screen W5 in FIG. 6E includes the message MS5b notifying the user that there may be a procedural problem, and the message MS5c prompting the user to contact the service provider operating the target server and provide an error notification, in substantially the same manner as the notification screen W2 in FIG. 6B.

After the user contacts the service provider, and the service provider takes an action to solve the problem, the user again inputs a user instruction into the printer 100. Namely, in response to receipt of the service start notice, the user inputs into the printer 100 the aforementioned user instruction to cause the printer 100 to start the sequence of processes shown in FIG. 4.

When the user instruction is input, S2B to S18B in FIG. 10 are executed with the input of the user instruction as the start trigger. The processes in S2B to S16B and S18A in FIG. 10 are, for instance, substantially the same as S2C to S8C and S10A to S18A in FIG. 8.

According to the first illustrative embodiment described above, the printer 100 performs the connection information obtaining process to obtain the connection information CI for connecting the printer 100 with the target server (i.e., the server 300A) from the intermediary server 400 (S4 in FIG. 4). The printer 100 performs the onboarding process to connect the printer 100 with the server 300A using the connection information CI (S14 in FIG. 4). The printer 100 notifies the user of an error when the printer 100 is unable to obtain the connection information CI in the connection information obtaining process (S815, S820, and S830 in FIG. 5). The printer 100 provides a first error notification (e.g., the notification screen W1) if the attempt timing at which the connection information obtaining process is attempted is a first time (e.g., a time of the initial power-on). The printer 100 provides a second error notification (e.g., the notification screen W2) if the attempt timing is a second time (e.g., a time at which a user instruction is input or the execution time has arrived) that is different from the first time (S810 to S820 in FIG. 5). As a result, it is possible to provide an appropriate error notification depending on the attempt timing at which the connection information obtaining process is attempted to obtain the connection information CI. Accordingly, it is possible to improve the user-friendliness of the printer 100 that is a device connectable with the target server. For instance, as described above, if the action to be taken by the user when an error has occurred differs according to the attempt timing, the printer 100 is enabled to provide an error notification according to the action to be taken by the user. Thus, it is possible to improve the user-friendliness of the printer 100.

Further, the above first time is a timing at which the connection information obtaining process is attempted for the first time (in the first illustrative embodiment, the time of the initial power-on) (S810: Yes in FIG. 5). The second time is a timing at which the connection information obtaining process is attempted for the second or subsequent time (in the first illustrative embodiment, when the execution time has arrived or when a user instruction is input) (S810: No in FIG. 5). According to this configuration, the printer 100 is enabled to provide an appropriate error notification depending on each of the timings at which the connection information obtaining process is attempted for the first time and at which the connection information obtaining process is attempted for the second or subsequent time. For instance, as described in the first illustrative embodiment, the status of the server 300A (e.g., whether the server 300A has started to provide the service or not) may differ between the timing at which the connection information obtaining process is attempted for the first time and the timing at which the connection information obtaining process is attempted for the second or subsequent time. Even in such a case, the printer 100 provides an appropriate error notification according to the situation.

Further, the above first time is a particular timing at which the connection information obtaining process is attempted (in the first illustrative embodiment, the time of the initial power-on) (S810: Yes in FIG. 5). The second time is a timing at which the execution time, set in the connection information obtaining process performed at the particular time or in the onboarding process, has arrived (S810: No in FIG. 5). According to this configuration, the printer 100 is enabled to provide an appropriate error notification depending on each of the timings at which the connection information obtaining process is performed at the particular time and at which the execution time has arrived. For instance, the status of the server 300A (e.g., whether the server 300A has started to provide the service or not) may differ between the particular timing and the timing at which the execution time has arrived. Even in such a case, the printer 100 is enabled to provide an appropriate error notification according to the situation.

Further, the above first time is a timing at which the printer 100 attempts the connection information obtaining process without receiving a user instruction. The second time is a timing at which the printer 100 attempts the connection information obtaining process in response to receiving a user instruction. For instance, as described in the first illustrative embodiment, the status of the server 300A may differ between when the connection information obtaining process is performed without receipt of a user instruction (e.g., at the time of the initial power-on) and when the connection information obtaining process is performed in response to receipt of a user instruction. Even in such a case, the printer 100 is enabled to provide an appropriate error notification according to the situation.

Further, the second error notification (e.g., the notification screen W2 in the first illustrative embodiment) provided at the above second time includes the message MS2c (see FIG. 6B) that prompts the user to contact a particular contact destination associated with the server 300A and provide a notification about the error. The first error notification (e.g., the notification screen W1 in the first illustrative embodiment) provided at the above first time does not include such a message (see FIG. 6A). As described above, the possibility that the error could be resolved, e.g., by contacting the particular contact destination (e.g., the service provider) may be high or low depending on the timing at which the connection information obtaining process is attempted. In the first illustrative embodiment, the printer 100 is enabled to provide an appropriate error notification according to such a situation.

Further, according to the first illustrative embodiment, the connection information CI to be obtained by the printer 100 includes the location information indicating the location of the server 300A (see FIG. 2D). Therefore, for instance, even though the printer 100 does not hold the location information of the server 300A when the printer 100 has been manufactured, the printer 100 is enabled to perform the onboarding process with the server 300A.

Further, according to the first illustrative embodiment, when the printer 100 has obtained from the intermediary server 400 the service start time information indicating that the service is not provided by the server 300A (S825: Yes in FIG. 5), the printer 100 provides a provision error notification (e.g., the notification screen W3 in the first illustrative embodiment) that includes the message MS3a indicating that the service is not provided (see S830 in FIG. 5, and FIG. 6B). Thereby, the printer 100 is enabled to provide an appropriate error notification when the service is not provided by the server 300A.

Further, according to the first illustrative embodiment, when an error has occurred in the onboarding process (S14 in FIG. 4), the printer 100 provides a connection error notification (e.g., the notification screen W4 or W5) different from the first error notification (e.g., the notification screen W1) that may be provided in the connection information obtaining process (S910 or S930 in FIG. 7). Thereby, the printer 100 is enabled to provide an appropriate notification according to the process in which an error has occurred.

Specifically, when an error has occurred in the connection establishment process, the printer 100 provides a third error notification (e.g., the notification screen W4) as the connection error notification. When an error has occurred in the authentication process or the service preparation process, the printer 100 provides, as the connection error notification, a fourth error notification (e.g., the notification screen W5) that is different from the third error notification. The fourth error notification (e.g., the notification screen W5) includes the message MS5c that prompts the user to contact a particular contact destination associated with the server 300A and provide a notification about the error (see FIG. 6E). The third error notification (e.g., the notification screen W4) does not include such a message (see FIG. 6D). As described above, depending on the type of error in the onboarding process, the possibility that the error could be resolved, e.g., by contacting the particular contact destination (e.g., the service provider) may be high or low. In the first illustrative embodiment, the printer 100 is enabled to provide an appropriate error notification according to such a situation.

Further, according to the first illustrative embodiment, when an error has occurred in the connection establishment process of the onboarding process, the onboarding process is retried (S915 in FIG. 7). When an error has occurred in the authentication process or the service preparation process of the onboarding process, the onboarding process is not retried (see FIG. 7). As described above, when an error has occurred in the connection establishment process, the error may be caused, for instance, due to a temporary communication failure or the server 300A being temporarily down. Therefore, in this case, the same error may not occur if the onboarding process is retried. When an error has occurred in the authentication process or the service preparation process, it is highly likely that some sort of action needs to be taken on the server 300A side. Therefore, in this case, substantially the same error is likely to occur even if the onboarding process is retried. According to the first illustrative embodiment, it is possible to retry the onboarding process as appropriate according to such a situation.

Further, according to the first illustrative embodiment, when the printer 100 is unable to complete the service preparation process because the service is not provided by the server 300A (S925: Yes in FIG. 7), as described above, the printer 100 provides an error notification (e.g., the notification screen W3 in FIG. 6C) including the message MS3*a* indicating that the service is not provided (S935 in FIG. 7). Thereby, the printer 100 is enabled to provide an appropriate notification even when the service is not provided by the server 300A.

Further, according to the first illustrative embodiment, when the service is not provided by the server 300A, the printer 100 receives the service start time information regarding when the service will start to be provided in the connection information obtaining process or the onboarding process (S825: Yes in FIG. 5, or S915: Yes in FIG. 7), and retries the connection information obtaining process and the onboarding process later than the service start time at which the service starts to be provided, based on the service start time information (S835 in FIG. 5 or S940 in FIG. 7). Thereby, the onboarding process is retried after the service has started to be provided by the target server. Thus, it is possible to appropriately complete the onboarding process.

B. SECOND ILLUSTRATIVE EMBODIMENT

In a second illustrative embodiment according to aspects of the present disclosure, as shown in FIG. 4, the start trigger for the sequence of processes in FIG. 4 is different from that in the aforementioned first illustrative embodiment. As shown by a dashed line in FIG. 1, the system 1000 of the second illustrative embodiment includes an information providing server 500 that is not provided in the first illustrative embodiment.

The information providing server 500 is, for instance, a server operated by the manufacturer of the printer 100. The printer 100 periodically (e.g., once a day) sends an information request signal to the information providing server 500. When the information providing server 500 has received the information request signal, if there is information to be sent to the printer 100, the information providing server 500 sends the information to the printer 100 as a response to the information request signal.

In the second illustrative embodiment, when the service has started to be provided by the server 300A, the information providing server 500 stores a service start notice indicating that the service has started to be provided by the server 300A, based on a notification from the server 300A or a terminal device of the business operator that operates the server 300A. The information providing server 500 sends the service start notice to the printer 100 when having received the information request signal from the printer 100 after storing the service start notice.

Examples of the start trigger for the sequence of processes shown in FIG. 4 in the second illustrative embodiment include the receipt of the service start notice instead of the user instruction in the aforementioned first illustrative embodiment. Namely, the examples of the start trigger for the sequence of processes in FIG. 4 in the second illustrative embodiment include, but are not limited to, the initial power-on and the arrival of the execution time, which are the same start triggers as used in the first illustrative embodiment, and the receipt of the service start notice, which is different from the start triggers used in the first illustrative embodiment (see FIG. 4). Therefore, in the second illustrative embodiment, when the service start notice is received after the initial power-on, the timing at which the connection information obtaining process in S4 of FIG. 4 is first attempted is before the service start notice is received. Then, the timing at which the connection information obtaining process in S4 of FIG. 4 is attempted afterward is after the service start notice is received.

Therefore, in the second illustrative embodiment, if an obtainment error in which the printer 100 is unable to obtain the connection information CI occurs in the connection information obtaining process in S4 of FIG. 4 that has been attempted at the timing of the initial power-on (S810: Yes in FIG. 5), the notification screen W1 in FIG. 6A is displayed (S815 in FIG. 5). If the connection information obtaining process in S4 of FIG. 4 has been attempted at a timing after receipt of the service start notice (S810: No in FIG. 5), the notification screen W2 in FIG. 6B is displayed in response to occurrence of the obtainment error (S820 in FIG. 5).

Thus, according to the second illustrative embodiment, the printer 100 is enabled to provide an appropriate error notification according to each timing at which the connection information obtaining process has been attempted, i.e., according to whether the connection information obtaining process has been attempted before or after receipt of the service start notice.

C. THIRD ILLUSTRATIVE EMBODIMENT

Figure 11:
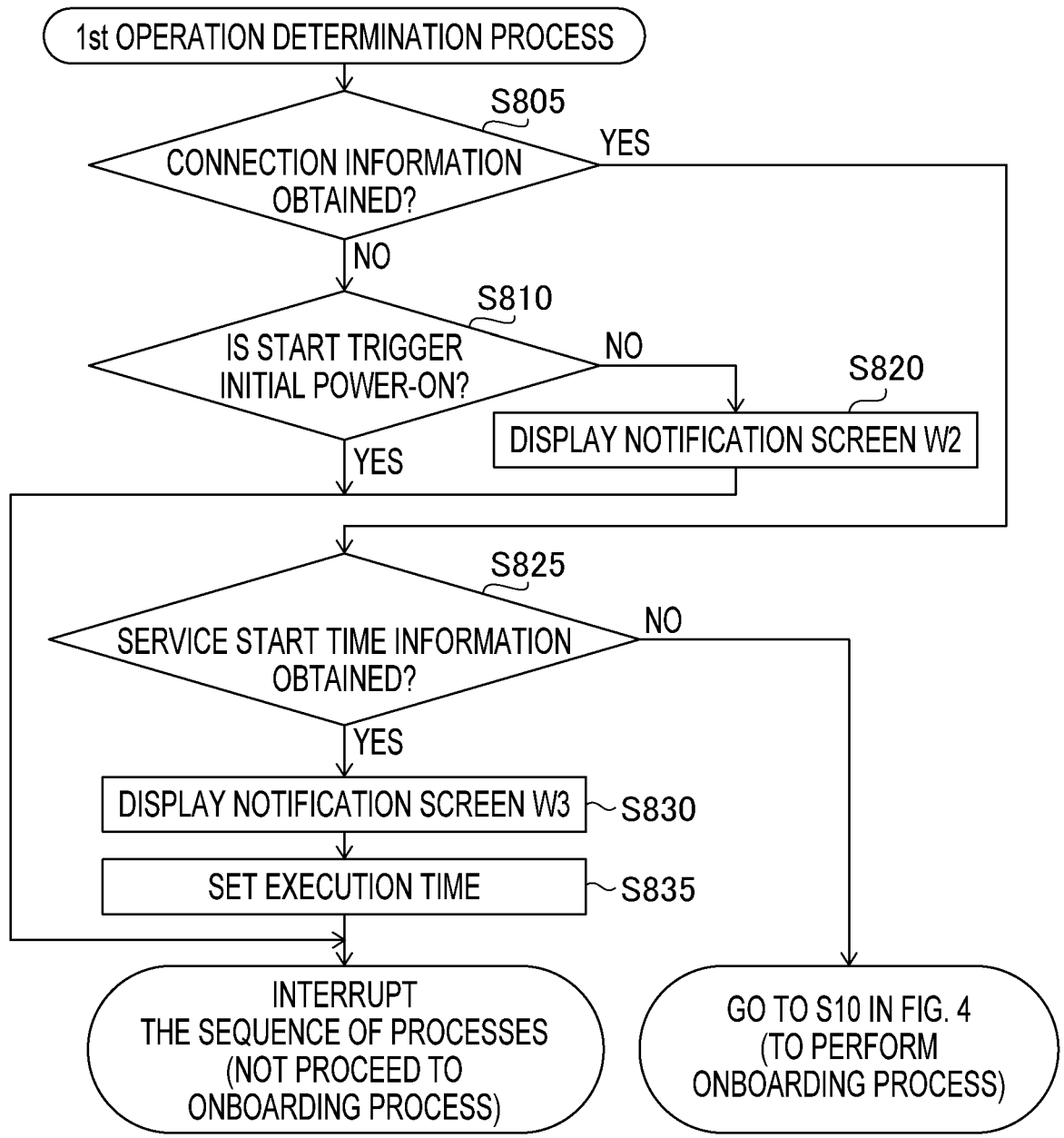
FIG. 11 is a flowchart showing another procedure of the first operation determination process.

FIG. 11 is a flowchart showing a procedure of a first operation determination process in a third illustrative embodiment according to aspects of the present disclosure. In the third illustrative embodiment, the first operation determination process is different from that in the aforementioned first illustrative embodiment. Namely, in the third illustrative embodiment, the first operation determination process shown in FIG. 11 is performed instead of the first operation determination process shown in FIG. 5.

A difference between the first operation determination process in FIG. 11 and the first operation determination process in FIG. 5 is that in the first operation determination process in FIG. 11, S815 in the first operation determination process of FIG. 5 is not executed. The other steps in the first operation determination process of FIG. 11 are the same as those represented with the same reference characters in the first operation determination process of FIG. 5.

In the first operation determination process of FIG. 11, the printer 100 determines in S810 whether the start trigger for the process in S2 of FIG. 4 is the initial power-on. When the start trigger is the initial power-on (S810: Yes), the printer 100 terminates the first operation determination process shown in FIG. 11 without displaying any notification screen. Thereby, the sequence of processes shown in FIG. 4 is interrupted.

When the start trigger is not the initial power-on (S810: No), the printer 100 displays the notification screen W2 on the display 140 in S820 in substantially the same manner as in the first operation determination process of FIG. 5, and then terminates the first operation determination process of FIG. 11. Thereby, the sequence of processes shown in FIG. 4 is interrupted. In the third illustrative embodiment, when the start trigger is not the initial power-on, the start trigger is a user instruction or the arrival of the execution time, in substantially the same manner as in the aforementioned first illustrative embodiment. Instead of this, or in addition to this, when the start trigger is not the initial power-on, the start trigger may be the receipt of the service start notice from the information providing server 500, in substantially the same manner as in the aforementioned second illustrative embodiment.

As understood from the above explanation, in the third illustrative embodiment, when an obtainment error in which the connection information CI is unable to be obtained has occurred in the connection information obtaining process in S4A of FIG. 8 (the operation example 1) described above, the sequence of processes in FIG. 4 is interrupted without any notification screen displayed in the first operation determination process in S8A of FIG. 8 (S810: Yes in FIG. 11). In this case, for instance, the user does not even recognize that the obtainment error has occurred.

According to the third illustrative embodiment described above, the printer 100 performs the connection information obtaining process to obtain from the intermediary server 400 the connection information CI for connecting the printer 100 with the server 300A that is the target server (S4 in FIG. 4). The printer 100 performs the onboarding process to connect the printer 100 with the server 300A using the connection information CI (S14 in FIG. 4). The printer 100 may notify the user of an error if the printer 100 is unable to obtain the connection information CI in the connection information obtaining process (S820 in FIG. 11). The printer 100 does not provide any error notification if the attempt timing at which the connection information obtaining process is attempted is a first time (e.g., a time of the initial power-on) (S810 in FIG. 11). The printer 100 provides the second error notification (e.g., the notification screen W2) that is the same as used in the aforementioned first illustrative embodiment, if the attempt timing at which the connection information obtaining process is attempted is a second time (e.g., a time at which a user instruction is input or the execution time has arrived) that is different from the first time (S820 in FIG. 11). As a result, it is possible to appropriately switch whether or not to provide the error notification depending on the timing at which the connection information obtaining process to obtain the connection information CI is attempted. Therefore, it is possible to improve the user-friendliness of the printer 100 that is a device connectable with the target server.

For instance, when an obtainment error has occurred at the time of the initial power-on, the user is likely to need to take no action. For instance, as described in the first illustrative embodiment, if the service is not provided by the target server (e.g., the server 300A) at the time when the obtainment error has occurred, the user needs only to wait for the service to be started and does not need to take any action. In addition, there may be a case where the user does not intend to use the service in the first place and has not signed a contract to use the service. In this case, even if the connection information obtaining process is performed at the time of the initial power-on, it is natural that the printer 100 fails to obtain the connection information CI for connecting the printer 100 with the server 300A that is the target server, and the obtainment error occurs. In this case, the user does not need to take any action. In a situation where the user does not need to take any action, even if an error notification is displayed, there is no benefit to the user, and it may rather cause only a disadvantage to give anxiety to the user. In contrast, when the connection information obtaining process is performed at a time different from the time of the initial power-on, e.g., at a time when a user instruction from the user who has received the service start notice is input or at a time when the execution time based on the service start time information has arrived, for instance, as described in the aforementioned first illustrative embodiment, the user is highly likely to need to take some sort of action such as contacting the service provider. Therefore, in this case, there is a high need to provide an error notification, in substantially the same manner as in the first illustrative embodiment. According to the third illustrative embodiment, when an obtainment error has occurred in the connection information obtaining process, it is possible to appropriately switch whether or not to provide an error notification according to the attempt timing at which the connection information obtaining process has been attempted, e.g., according to whether there is a need for the user to take some sort of action. Thus, it is possible to improve the user-friendliness of the printer 100.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the disclosure are provided below.

D. MODIFICATIONS

In the aforementioned illustrative embodiments, the connection information obtaining process is performed between the printer 100 and the intermediary server 400, which is different from the servers 300A to 300D that provide the respective services, and the printer 100 obtains the connection information CI from the intermediary server 400. Instead, in a modification according to aspects of the present disclosure, the connection information obtaining process may be performed between the printer 100 and one (e.g., the server 300A) of the servers 300A to 300D, and the printer 100 may obtain the connection information CI from the server 300A. In this case, for instance, the server 300A may perform the connection information obtaining process with the printer 100 when accessed by the printer 100 using a first URL. Further, the server 300A may perform the onboarding process with the printer 100 when accessed by the printer 100 using a second URL. Then, instead of the intermediary server information RSI, information (including the first URL) for connecting the printer 100 with the server 300A may be stored in the non-volatile memory 130 of the printer 100.

In the aforementioned illustrative embodiments, to obtain the service start time information, the printer 100 sets the next execution time and automatically retries the connection information obtaining process. Instead, in a modification according to aspects of the present disclosure, to obtain the service start time information, the printer 100 may display a notification screen that includes a message notifying the user of the service start time. In this case, the printer 100 may retry the connection information obtaining process in response to a user instruction being input into the printer 100 after the service start time has arrived.

In the aforementioned illustrative embodiments, the intermediary server 400 and the server 300A send the service start time information when the service has not started to be provided by the server 300A. Instead, in a modification according to aspects of the present disclosure, information indicating only that the service has not started to be provided and not indicating the service start time may be sent. In this case, the printer 100 is unable to automatically set the execution time. Therefore, the printer 100 may not set the execution time. In this case, for instance, when the user receives the service start notice, the next connection information obtaining process may be attempted in response to a user instruction being input into the printer 100.

Instead of the service start time information, other types of time information related to the time at which the service is to start to be provided may be used. For instance, recommended time information may be used to indicate a recommended execution time that is set later than the time at which the service is to start to be provided. For instance, the server 300A and the intermediary server 400 may send recommended time information indicating recommended execution times that are slightly different for each of printers to which the recommended time information is to be sent, in such a manner that access to the server 300A from the printers is not concentrated at the same time. In this case, for instance, in response to receiving the recommended time information, the printer 100 may set the next execution time to the recommended execution time indicated by the recommended time information in S835 in FIG. 5 or in S940 in FIG. 7.

In the aforementioned illustrative embodiments, the notification screen W2 (see FIG. 6B) and the notification screen W5 (see FIG. 6E) include the messages MS2c and MS5c, respectively, which prompt the user to contact the particular contact destination to notify them of the error. Instead, in a modification according to aspects of the present disclosure, these notification screens W2 and W5 may include a message presenting a method that is implementable by the user himself/herself to solve the problem. For instance, the notification screen W2 may include, instead of or together with the message MS2c, a message presenting a method for the user to re-send the voucher VC to the server 300A using the user's own terminal device and/or a URL for viewing an explanation of the method.

The first operation determination process and the second operation determination process in the aforementioned illustrative embodiments are merely examples, and some processes thereof may be omitted or modified as appropriate. For instance, in the first operation determination process and the second operation determination process, the setting of the execution time (S835 in FIGS. 5 and S940 in FIG. 7) may be omitted. If the execution time is not set in the first operation determination process, the notification screen W1 may be displayed instead of the notification screen W3 in S830 of FIG. 5.

For instance, a plurality of notification screens may be used separately as appropriate only in the first operation determination process. Meanwhile, in the second operation determination process, a common notification screen may always be displayed when an error occurs. For instance, the common notification screen may be a screen simply notifying the user that an error has occurred in the onboarding process.

For instance, in the second operation determination process, the setting of retries in S915 of FIG. 7 may be omitted. In this case, the notification screen W4 displayed in S910 may include a message that prompts the user to input a user instruction to retry the connection information obtaining process after a lapse of a particular time.

The wordings of the messages shown in the notification screens W1 to W5 (see FIGS. 6A to 6E) are merely examples, and the applicable wordings for the messages are not limited to the examples as shown. For instance, other wordings expressing similar meanings may be applied for the messages.

The printer 100 provides notifications to the user by displaying the notification screens W1 to W5 (see FIGS. 6A to 6E) on its own display 140. Instead of this, the printer 100 may provide notifications to the user in other methods, e.g., using the display and/or audio output of the user's terminal device. In this case, for instance, the printer 100 may send, to the user's terminal device, notification data indicating the notification contents shown on the notification screens W1 to W5.

In each of the aforementioned illustrative embodiments, the printer 100 is employed as a "device" according to aspects of the present disclosure. However, the "device" according to aspects of the present disclosure is not necessarily limited to the printer 100. Other devices, each of which is configured to provide a service to the user in cooperation with a target server, may be employed. Examples of the services using said other devices may include, but are not limited to, remote control of the other devices (e.g., security cameras, and appliances such as cooking utensils) set up in the home or an office from a terminal device (a terminal application) via the target server.

In the aforementioned illustrative embodiments, a part of the configuration achieved by hardware may be realized by software. Conversely, a part or all of the configuration achieved by software may be realized by hardware.

The following shows examples of associations between elements illustrated in the aforementioned illustrative embodiment(s) and modification(s), and elements claimed according to aspects of the present disclosure. For instance, the printer 100 may be an example of a "device" according to aspects of the present disclosure. The communication I/F 180 may be an example of a "communication interface" according to aspects of the present disclosure. The CPU 110, the volatile memory 120, and the non-volatile memory 130 may be included in a "controller" according to aspects of the present disclosure. The CPU 110 may be an example of a "processor" according to aspects of the present disclosure. The non-volatile memory 130 may be an example of a "non-transitory computer-readable storage medium" according to aspects of the present disclosure. The computer programs PGp stored in the non-volatile memory 130 may be an example of "computer-readable instructions" according to aspects of the present disclosure. The servers 300A to 300D may be included in examples of a "target server" according to aspects of the present disclosure. The intermediary server 400 may be an example of an "external device" according to aspects of the present disclosure.

What is claimed is:

1. A device comprising:
    a communication interface; and
    a controller configured to:
        obtain connection information for connecting the device with a target server from an external device via the communication interface;
        connect the device with the target server using the obtained connection information; and
        in response to failing in an attempt to obtain the connection information, provide an error notification varying depending on at what timing the attempt to obtain the connection information has been made, wherein the controller provides a first error notification when the attempt to obtain the connection information has been made at a first timing, whereas the controller provides a second error notification different from the first error notification when the attempt to obtain the connection information has been made at a second timing different from the first timing.

2. The device according to claim 1,
    wherein the first timing is a timing at which the attempt to obtain the connection information has been made for a first time, and
    wherein the second timing is a timing at which the attempt to obtain the connection information has been made for a second or subsequent time.

3. The device according to claim 1,
    wherein the controller is further configured to receive a user instruction to obtain the connection information,
    wherein the first timing is a timing at which the attempt to obtain the connection information has been made without the user instruction received, and
    wherein the second timing is a timing at which the attempt to obtain the connection information has been made in response to receipt of the user instruction.

4. The device according to claim 1,
    wherein the controller is further configured to receive information regarding provision of a service by the target server,
    wherein the first timing is a timing at which the attempt to obtain the connection information has been made before receipt of the information regarding provision of the service, and
    wherein the second timing is a timing at which the attempt to obtain the connection information has been made after receipt of the information regarding provision of the service.

5. The device according to claim 1,
    wherein the second error notification contains a message that prompts a user of the device to contact a particular contact destination related to the target server and notify the particular contact destination of a failure in the attempt to obtain the connection information, and
    wherein the first error notification does not contain the message.

6. The device according to claim 1,
    wherein the connection information includes location information indicating a location of the target server.

7. The device according to claim 1,
    wherein the controller is further configured to:
        when the target server is not providing a service, obtain non-provision information indicating that the target server is not providing the service, the non-provision information being different from the connection information; and
        in response to obtaining the non-provision information, provide a provision error notification that contains a message indicating that the target server is not providing the service.

8. The device according to claim 7,
    wherein the non-provision information includes time information regarding a time at which the target server is to start providing the service, and
    wherein the controller is further configured to, in response to obtaining the time information included in the non-provision information, again make the attempt to obtain the connection information after the time at which the target server has started to provide the service, based on the obtained time information.

9. The device according to claim 1,
    wherein the controller is further configured to provide a connection error notification different from the first error notification, in response to an error occurring in an attempt to connect the device with the target server after obtaining the connection information.

10. The device according to claim 9,
    wherein the controller is further configured to:
        in the attempt to connect the device with the target server, perform a first process to connect the device with an application running on the target server, and a second process between the device and the application after the first process;
        in response to occurrence of an error in the attempt to connect the device with the target server, provide the connection error notification varying depending on which of the first and second processes the error has occurred in, wherein the controller provides, as the connection error notification, a third error notification when the error has occurred in the first process, whereas the controller provides, as the connection error notification, a fourth error notification different from the third error notification when the error has occurred in the second process,
    wherein the fourth error notification contains a message that prompts a user of the device to contact a particular contact destination related to the target server and notify the particular contact destination of the error that has occurred in the attempt to connect the device with the target server, and
    wherein the third error notification does not contain the message.

11. The device according to claim 10,
    wherein the controller is further configured to:
        when the error has occurred in the first process, again make the attempt to connect the device with the target server; and
        when the error has occurred in the second process, not again make the attempt to connect the device with the target server.

12. The device according to claim 10,
    wherein the second process comprises a preparation process to communicate with the target server and use a service provided by the target server, and wherein the controller is further configured to, when the controller is unable to complete the preparation process because the target server is not providing the service, provide a provision error notification that contains a message indicating that the target server is not providing the service.

13. The device according to claim 12,
wherein the controller is further configured to:
receive time information regarding a time at which the target server is to start providing the service; and
in response to receiving the time information, again make the attempt to connect the device with the target server after the time at which the target server has started to provide the service, based on the received time information.

14. The device according to claim 1,
wherein the controller is further configured to obtain the connection information in accordance with Transfer Ownership Protocol 1 specified in FIDO Device Onboard Specification.

15. The device according to claim 1,
wherein the controller is further configured to connect the device with the target server in accordance with Transfer Ownership Protocol 2 specified in FIDO Device Onboard Specification.

16. The device according to claim 1,
wherein the controller comprises:
a processor; and
a non-transitory computer-readable storage medium storing computer-readable instructions that, when executed by the processor, cause the controller to:
obtain the connection information from the external device via the communication interface;
connect the device with the target server using the obtained connection information; and
in response to failing in the attempt to obtain the connection information, provide the error notification varying depending on at what timing the attempt to obtain the connection information has been made, wherein the controller provides the first error notification when the attempt to obtain the connection information has been made at the first timing, whereas the controller provides the second error notification different from the first error notification when the attempt to obtain the connection information has been made at the second timing different from the first timing.

17. A device comprising:
a communication interface; and
a controller configured to:
obtain connection information for connecting the device with a target server from an external device via the communication interface;
connect the device with the target server using the obtained connection information; and
in response to failing in an attempt to obtain the connection information, determine whether to provide an error notification based on at what timing the attempt to obtain the connection information has been made, wherein the controller provides no error notification when the attempt to obtain the connection information has been made at a first timing, whereas the controller provides the error notification when the attempt to obtain the connection information has been made at a second timing different from the first timing.

18. A non-transitory computer-readable storage medium storing computer-readable instructions executable by a processor of a device comprising a communication interface, the instructions being configured to, when executed by the processor, cause the device to:
obtain connection information for connecting the device with a target server from an external device via the communication interface;
connect the device with the target server using the obtained connection information; and
in response to failing in an attempt to obtain the connection information, provide an error notification varying depending on at what timing the attempt to obtain the connection information has been made, wherein the instructions, when executed by the processor, cause the device to provide a first error notification when the attempt to obtain the connection information has been made at a first timing, whereas the instructions, when executed by the processor, cause the device to provide a second error notification different from the first error notification when the attempt to obtain the connection information has been made at a second timing different from the first timing.

* * * * *